US006975607B2

(12) United States Patent
Sekine et al.

(10) Patent No.: US 6,975,607 B2
(45) Date of Patent: *Dec. 13, 2005

(54) MOBILE COMMUNICATION SYSTEM FOR ACCOMPLISHING HANDOVER WITH PHASE DIFFERENCE OF FRAME SYNC SIGNALS CORRECTED

(75) Inventors: Kiyoki Sekine, Tokyo (JP); Manabu Kawabe, Tokyo (JP); Kenji Horiguchi, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 776 days.

This patent is subject to a terminal disclaimer.

(21) Appl. No.: 09/854,514

(22) Filed: May 15, 2001

(65) Prior Publication Data

US 2001/0024430 A1 Sep. 27, 2001

Related U.S. Application Data

(62) Division of application No. 08/956,125, filed on Oct. 22, 1997, now Pat. No. 6,259,683.

(30) Foreign Application Priority Data

Nov. 28, 1996 (JP) .................................. 8-317392
Dec. 20, 1996 (JP) .................................. 8-341058

(51) Int. Cl.[7] ................................................ H04Q 7/00
(52) U.S. Cl. ....................... 370/331; 370/335; 455/437
(58) Field of Search ............................... 370/320, 331, 370/335, 342, 441, 503; 375/354, 358; 455/436–442

(56) References Cited

U.S. PATENT DOCUMENTS 5,479,397 A 12/1995 Lee
5,539,749 A 7/1996 Eul
5,673,260 A * 9/1997 Umeda et al. .............. 370/342
5,722,074 A * 2/1998 Muszynski .................. 455/442
5,828,659 A 10/1998 Teder et al.

(Continued)

FOREIGN PATENT DOCUMENTS

EP 0335846 10/1989

(Continued)

OTHER PUBLICATIONS

"Mobile Station-Base Station Compatibility Standard for Dual-Mode Wideband Spread Spectrum Cellular System", TIA/EIA/IS-95, Jul. 1993, U.S.A.

(Continued)

*Primary Examiner*—Frank Duong
(74) *Attorney, Agent, or Firm*—Wenderoth, Lind & Ponack, L.L.P.

(57) ABSTRACT

A method of switching a communication channel when a mobile station moves from one service area to another service area is disclosed. The mobile station determines a difference between the transmission phase of a frame synchronizing signal received from a first base station currently holding a communication channel with the mobile station and the transmission phase of a frame synchronizing signal received from a second base station expected to newly set up a communication channel with the mobile station. The mobile station sends phase difference information representative of the above difference to the first base station via the communication channel. The first base station having received the phase difference information transfers the information to the second base station, causing it to correct the phase of data thereof to be sent to the mobile station. This successfully implements soft handover while guaranteeing the phase synchronization of frames sent from the two base stations.

4 Claims, 17 Drawing Sheets

U.S. PATENT DOCUMENTS

| | | | | |
|---|---|---|---|---|
| 5,862,124 A | * | 1/1999 | Hottinen et al. | 370/335 |
| 5,920,557 A | * | 7/1999 | Hirata | 370/350 |
| 5,920,817 A | | 7/1999 | Umeda et al. | |
| 6,711,149 B1 | | 3/2004 | Yano et al. | |

FOREIGN PATENT DOCUMENTS

| | | |
|---|---|---|
| EP | 0522774 | 1/1993 |
| EP | 0777395 | 6/1997 |
| EP | 0823827 | 2/1998 |
| EP | 0869629 | 10/1998 |
| JP | 6-334593 | 12/1994 |
| JP | 06334593 | 12/1994 |
| WO | 94/30024 | 12/1994 |
| WO | 95/08899 | 3/1995 |
| WO | 95/12296 | 5/1995 |
| WO | 95/12297 | 5/1995 |
| WO | 96/07252 | 3/1996 |
| WO | 96/18277 | 6/1996 |
| WO | 98/19492 | 5/1998 |

OTHER PUBLICATIONS

"CDMA: Principles of Spread Spectrum Communication", Andrew Viterbi, Addison-Wesley Wireless Communications Series, pp. 185-195, 1995.

"Developments on Cellular Configuration Architecture", N. Nakajima, NTT DoCoMo Technical Journal, vol. 1, No. 2, pp. 21-29.

* cited by examiner

MOBILE COMMUNICATION SYSTEM FOR ACCOMPLISHING HANDOVER WITH PHASE DIFFERENCE OF FRAME SYNC SIGNALS CORRECTED

This is a Rule 1.53(b) Divisional Application of Ser. No. 08/956,125, Filed Oct. 22, 1997 now U.S. Pat. No. 6,259,683.

BACKGROUND OF THE INVENTION

1. Field of the Invention

The present invention relates to a mobile communication system and, more particularly, to personal communication services (PCS), digital cellular communication system or similar mobile communication system using a code division multiple access (CDMA) scheme. Also, the present invention relates to a mobile station, a base station and a mobile communication control center (MCC) constituting the mobile communication system. Further, the present invention is concerned with a method of switching a communication channel in order to effect handover between base stations included in the above system, and an arrangement for practicing the same.

2. Description of the Background Art

A mobile communication system, particularly a CDMA mobile communication system controlling transmission power in order to reduce interference between users, is discussed in, e.g., "Mobile Station-Base Station Compatibility Standard for Dual-Mode Wideband Spread Spectrum Cellular System", TIA/EIA/IS-95, July, 1993, U.S.A. (Document 1 hereinafter), Andrew J. Viterbi "CDMA: Principles of Spread Spectrum Communication", Addison-Wesley Wireless Communications Series, pp. 185–195, 1995 (Document 2 hereinafter), and N. Nakajima "Developments on Cellular Configuration Architecture", NTT DoCoMo Technical Journal, Vol. 1, No. 2, pp. 21–29 (Document 3 hereinafter).

Document 1 describes a US standard system relating to a radio interface between a mobile station and a base station included in the CDMA communication system. Document 2 teaches a specific arrangement of base stations in the CDMA communication system described in Document 1. Further, Document 3 teaches the arrangement of base stations in a current digital cellular telephone system called a PDC (Personal Digital Cellular) system, and the sectoring of the base stations.

It is a common practice with the CDMA communication system to define transmission paths between the MCC and the base stations by use of synchronous digital hierarchy (SDH hereinafter), and send information at a transmission rate particular to the SDH. The MCC multiplexes the transmission paths by time division multiplexing and thereby send user information (including speech information and computer data) and control information relating to the mobile stations existing in service areas controlled by the base stations.

In the conventional CDMA communication system, the mobile stations, base stations and MCC each includes a receiver implemented by a global positioning system (GPS hereinafter) and has absolute time. These constituents therefore operate in synchronism with each other. It follows that when a down-going link from the base station to the mobile station is switched from a certain base station in communication to another base station, a plurality of base stations can send the same information in synchronism, allowing the mobile station to perform maximum ratio combination diversity receipt. This frees signals from momentary interruption even at the time of switching of a down-going link. This kind of handover will be referred to as soft handover.

With CDMA communication controlling transmission power for the previously mentioned purpose, it is possible to reduce transmission power by using cell diversity available with soft handover, to increase the number of mobile stations connectable to a single base station, and to thereby enhance the communication efficiency of the entire system.

However, the prerequisite with the conventional technologies is that for soft handover a period of time necessary for information multicast from the MCC at a certain time to reach a base station expected to newly join in communication with a base station be shorter than a period of time necessary for the same information to reach a base station currently communicating with the mobile station. This is because when a speech or similar continuous information is sent, the link between the mobile station and the base station currently in connection must be maintained.

Specifically, the link to be formed from the base station to be connected next and the mobile station must be synchronous with the link currently held as to the transmission of information. Should information fail to reach the base station expected to set up synchronization at the above timing, soft handover would fail. If soft handover is not practicable, the mobile station expected to receive a speech or similar continuous information executes switching involving momentary interruption of information. Let this handover be referred to as hard handover, as distinguished from soft handover free from the above occurrence.

The probability that the above condition for soft handover cannot be satisfied increases when the distances from the MCC to the base stations are not the same. In light of this, while the MCC reports the head of a transmission unit of a radio interface to each base station, each base station inserts a preselected delay for a buffering purpose. Although this kind of scheme eases the condition for soft handover, it cannot surely guarantee soft handover. Further, because system synchronization is not achievable unless each mobile station is equipped with a GPS receiver, the inexpensive configuration of a terminal is limited.

With CDMA communication, it is possible to reduce transmission power by using cell diversity available with soft handover, to increase the number of mobile stations connectable to a single base station, and to thereby enhance the communication efficiency of the entire system, as stated earlier. However, in the systems taught in Documents 1 and 2, each base station is provided with a nondirectional antenna. Therefore, on an up-going link from a certain mobile station to a base station, communication quality is deteriorated due to interference caused by a signal sent from another mobile station. As a result, the number of mobile stations connectable to a single base station is reduced.

In order to solve the above problem, applying the TDMA digital cellular telephone technology disclosed in Document 3 to the CDMA communication system is now in study. The technology of Document 3 is such that each cell is subdivided into a plurality of sectors in order to enhance the efficient reuse of frequency, thereby increasing the number of mobile stations connectable to a single base station. However, no specific system configurations or control methods have been reported yet.

SUMMARY OF THE INVENTION

It is therefore an object of the present invention to provide a mobile communication system capable of actually implementing soft handover between base stations and between sectors belonging to a single cell.

In accordance with the present invention, a method of controlling switching of a communication channel when a mobile station located in a first service area moves to a second service area adjoining the first service area causes the mobile station to determine a difference between the transmission phase of a frame synchronizing signal received from a first base station currently holding a communication channel with the mobile station and the transmission phase of a frame synchronizing signal received from a second base station expected to newly set up a communication channel with the mobile station. Phase difference information representative of the difference is sent to the first base station via the communication channel. The first base station having received the phase difference information transfers the information to the second base station, and thereby causes the second base station to correct the phase of data thereof to be sent to the mobile station.

Also, in accordance with the present invention, an MCC accommodates a plurality of base stations, each of which is capable of setting up a communication channel with a mobile station for interchanging communication data, and controls the switching of the communication channel to be effected between two or more of the base stations and the mobile station. A phase difference reporting circuit reports phase difference information, which the mobile station sent to a first base station currently holding a communication channel with the mobile station by determining a difference between the transmission phase of the first base station and the transmission phase of a second base station expected to newly set up a communication channel, to the second base station.

Further, in accordance with the present invention, base station accommodated in an MCC together with other base stations is capable of interchanging particular data with each of one or more mobile stations via a respective communication channel. Such a base station includes a synchronizing signal sending circuit for sending a transmission frame period to a mobile station which is currently holding a communication channel or which is expected to set up a communication channel with the mobile station. The transmission frame period is based on a clock generated inside of the base station. When the mobile station, which moves from a service area defined by the base station to another service area defined by another base station adjoining the above base station, sends to the base station phase difference information representative of a difference between the transmission phase of a frame synchronizing signal received from the other base station (expected to newly set up a communication channel) and the transmission phase of a frame synchronizing signal received from the above base station, a phase difference reporting circuit reports the information to the another base station.

Moreover, in accordance with the present invention, a mobile station for interchanging communication data via a communication channel with a base station, which controls a service area in which the mobile station is located, includes a phase difference detecting circuit for detecting a difference between the transmission phase of a frame synchronizing signal received from a first base station, currently holding a communication channel with the mobile station, and the transmission phase of a frame synchronizing signal received from a second base station expected to newly set up a communication channel with the mobile station. A phase difference reporting circuit reports the difference to the first base station as phase difference information.

BRIEF DESCRIPTION OF THE DRAWINGS

The objects and features of the present invention will become more apparent from the consideration of the following detailed description taken in conjunction with the accompanying drawings in which.

Figure 1:
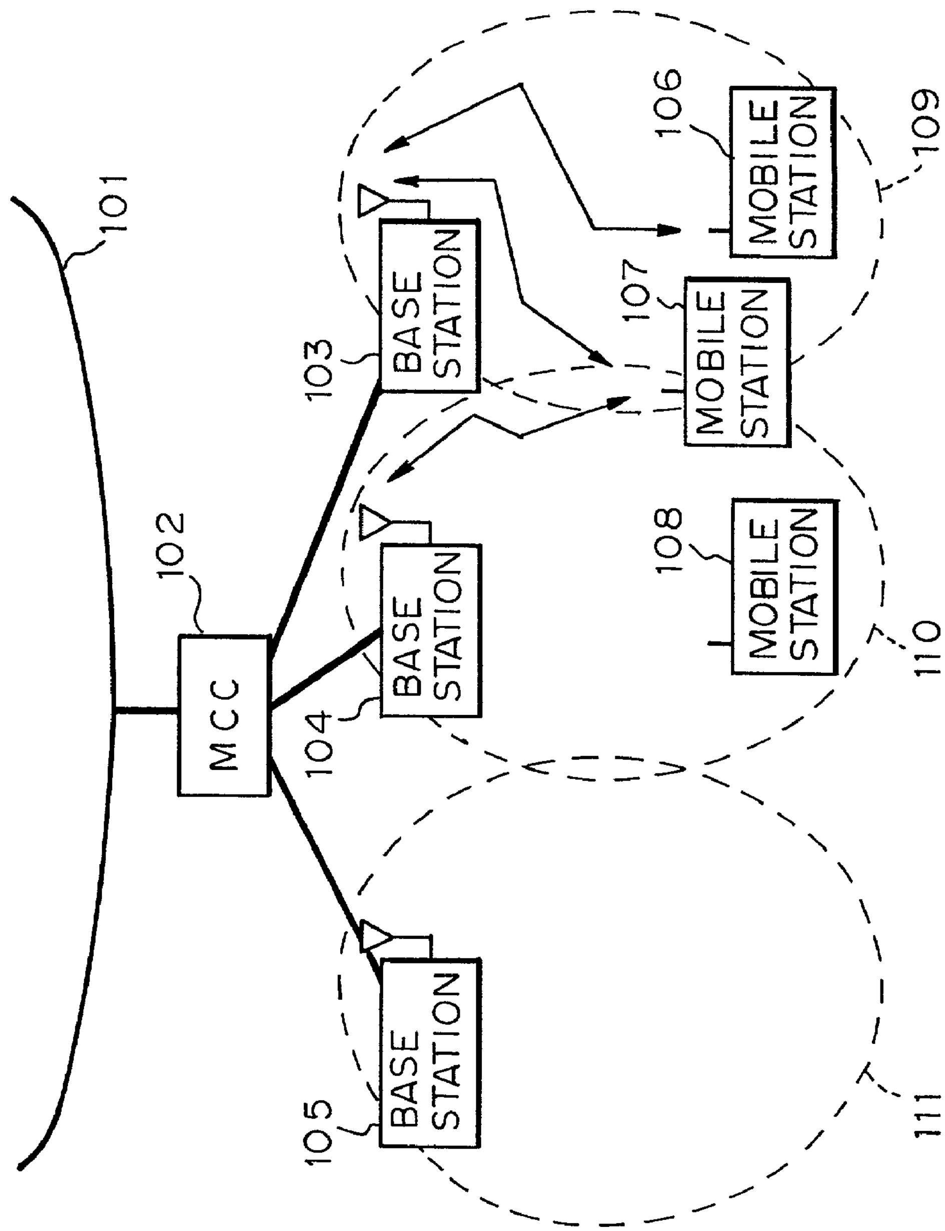
FIG. 1 is a block diagram schematically showing a CDMA communication system embodying the present invention.

In the drawings, identical references denote identical structural elements.

DESCRIPTION OF THE PREFERRED EMBODIMENTS

Referring to FIG. 1 of the drawings, a mobile communication system embodying the present invention is shown and implemented by the code division multiple access (CDMA) scheme by way of example. As shown, the communication system includes a single mobile communication control center (MCC) 102 connected to a communication network 101. Three base stations 103, 104 and 105 are connected to the MCC 102 by wired paths. Three mobile stations 106, 107 and 108 are each connectable to any one of the base stations 103-105 via a radio transmission path for interchanging user data. The base stations 103-105 respectively define service areas or cells 109, 110 and 111, as indicated by dashed lines in FIG. 1.

The MCC 102 and communication network 101 are interconnected by suitable transmission interfaces particular to the synchronous digital hierarchy (SDH). As for transmission and switching between the network 101 and the MCC 102, either one of an asynchronous transfer mode (ATM hereinafter) and a synchronous transfer mode (STM hereinafter) may be used, as desired.

The base stations 103–105 and MCC 102 are also interconnected by suitable transmission interfaces prescribed by the SDH. While transmission and switching between the MCC 102 and the base stations 103–105 may also be implemented by either one of ATM and STM, ATM requires each of the base stations 103–105 to include an ATM-STM converter and an STM-ATM converter on its down-going path and up-going path, respectively.

As shown in FIG. 1, assume that the mobile station 106 is communicating with the base station 103, that the mobile station 107 is communicating with the base stations 103 and 104 at the same time, and that the mobile station 108 is not communicating with any one of the base stations 103–105. The mobile stations 106 and 108 each communicates with one of the base stations 103 and 104 from which a signal is received in the best condition over the radio channel. Therefore, the mobile stations 106 and 108 each switches the base station when moving from one cell to another cell. The communication of one mobile station with a plurality of base stations to occur at the time of such switching will be referred to as handover. In the specific condition shown in FIG. 1, the condition of the mobile station 107 is the handover. It is noteworthy that the communication of one mobile station with a plurality of base stations provides a cell diversity effect which reduces transmission power and thereby reduces interference with the other stations.

The mobile stations 106–108 each communicates with a terminal connected to the network 101 via at least one of the base stations 103–105 and the MCC 102, or communicates with another mobile station belonging to the same system again by way of one of the base stations 103–105 accommodated in the MCC 102.

Figure 2:
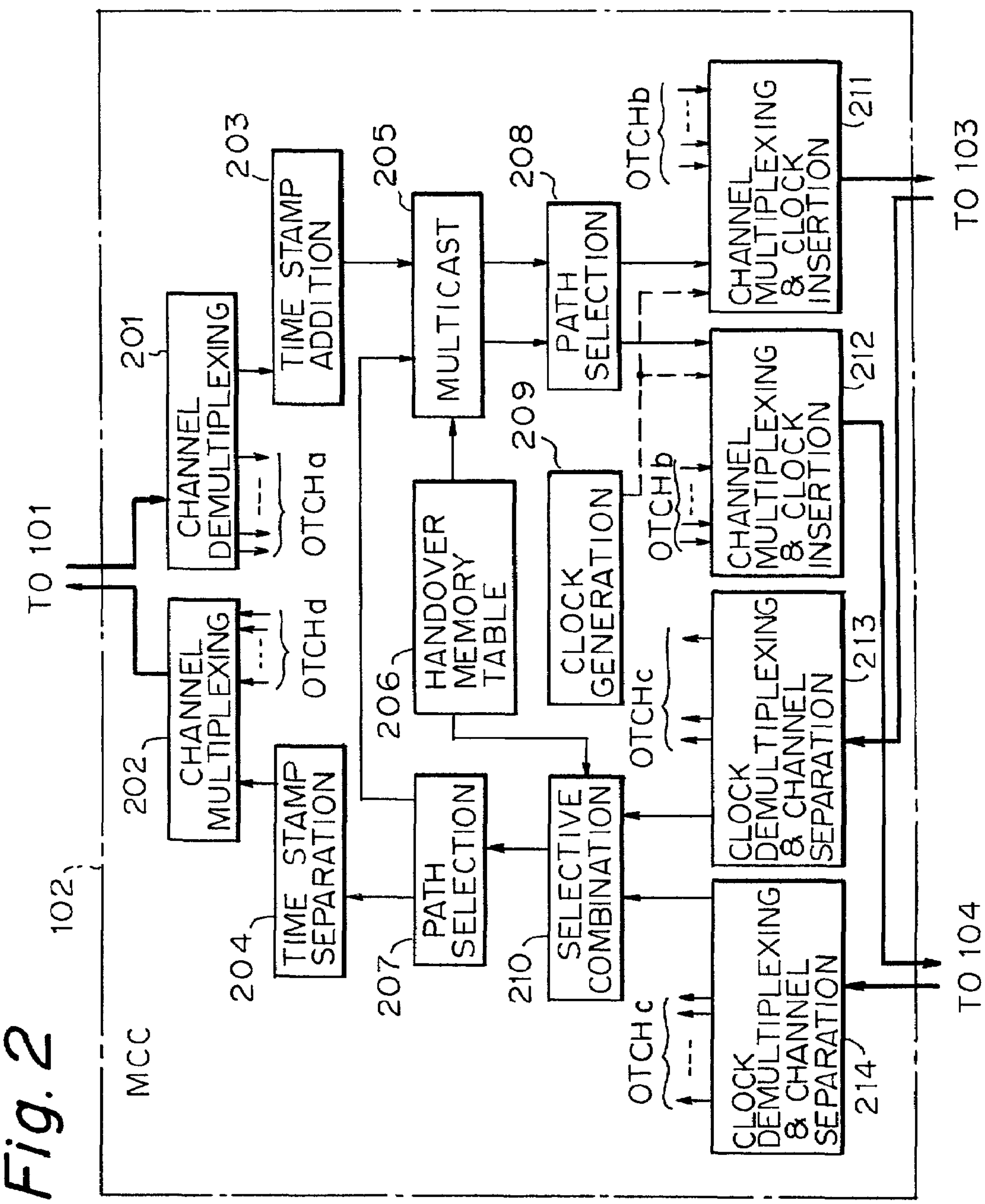
FIG. 2 is a schematic block diagram showing an MCC included in the embodiment.

FIG. 2 shows a specific configuration of the MCC 102. In FIG. 2, the MCC 102 is assumed to be connected to the network 101 and base stations 103 and 104, as in FIG. 1; the connection of the MCC 102 to the base station 105 and the circuitry associated therewith are not shown just for simplicity. As shown, the MCC 102 has a channel demultiplexer 201, a channel multiplexer 202, a time stamp adder 203, a time stamp separator 204, a multicast 205, a handover memory table 206, path selectors 207 and 208, a clock generator 209, a selective combiner 210, channel multiplexer and clock inserters 211 and 212, and channel demultiplexer and clock separators 213 and 214.

In the circuitry shown in FIG. 2, the path selectors 207 and 208 and multicast 205 return fold back phase difference information sent from a base station currently holding a communication channel and meant for a base station expected to newly set up a communication channel. In this sense, the path selectors 207 and 208 and multicast 205 play the role of phase difference reporting means. The time stamp adder 203 decomposes communication data at unit time intervals shorter than a frame length and adds an unconditional identification (ID) code thereto. The time stamp adder 203 therefore serves as ID code adding means. The multicast 205 plays the role of multicasting means. Further, when a plurality of base stations receive data from the same mobile station, individually modulate the data, and send the modulated data to the MCC 102, the selective combiner or selective combining means 210 selectively combines the received data on the basis of reliability information which will be described.

The MCC 102 controls handover between the base stations. Specifically, the MCC 102 determines base stations relating to handover on the basis of receipt condition information sent from a mobile station and representative of receipt conditions between the mobile station and the base stations, and the traffic of the individual base station. The receipt condition information each is implemented as a combination of a name or code assigned to the individual base station and the receipt conditions including received power and a receipt SN (Signal-to-Noise) ratio.

Figure 3:
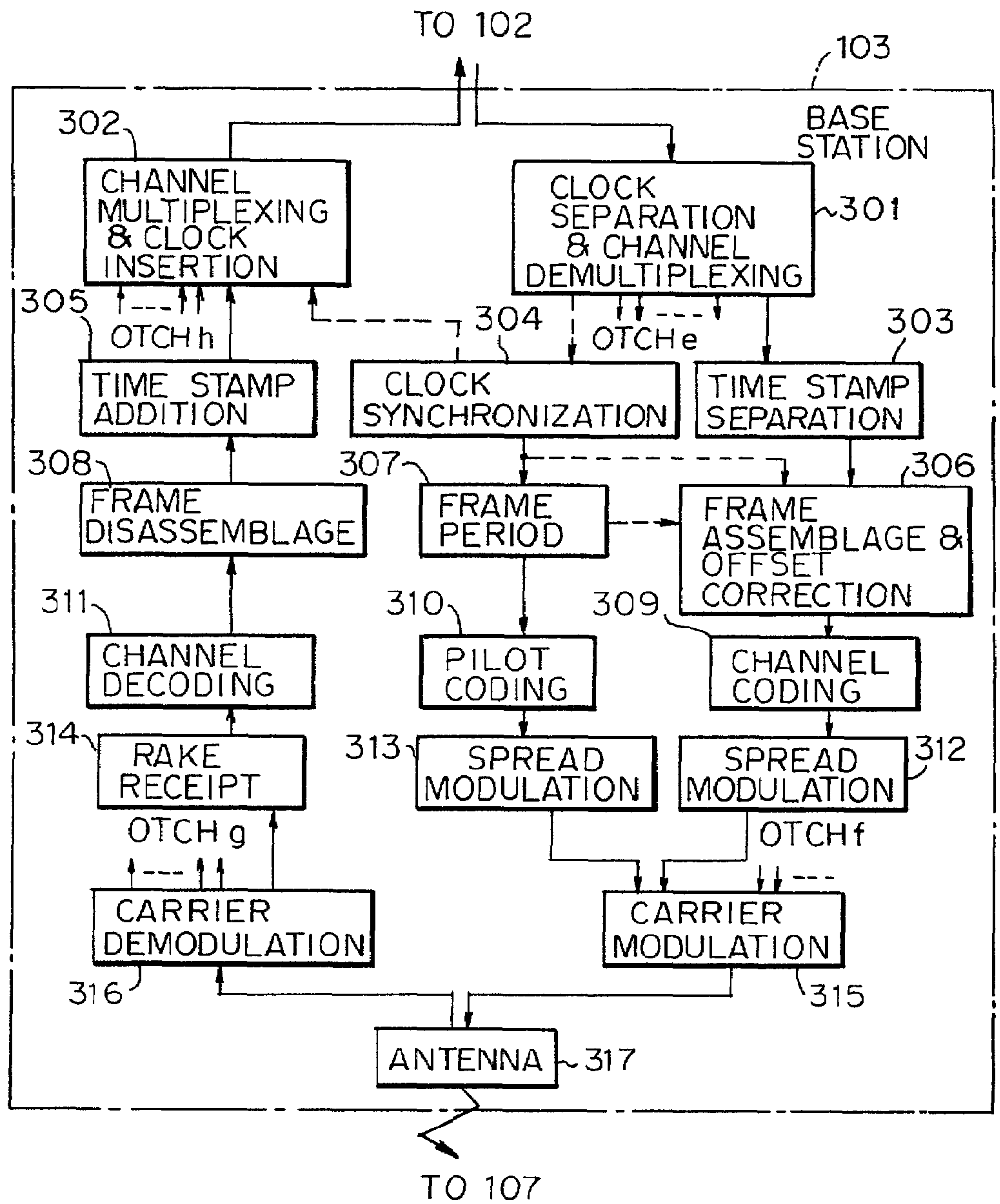
FIG. 3 is a schematic block diagram showing a base station also included in the embodiment.

FIG. 3 shows a specific construction of each base station, e.g., the base station 103. The other base stations 104 and 105 are identical in construction with the base station 103. As shown, the base station 103 has a clock separator and channel demultiplexer 301, a channel multiplexer and clock inserter 302, a time stamp separator 303, a clock synchronizer 304, a time stamp adder 305, a frame assembler and offset corrector 306, a frame period generator 307, a frame disassembler 308, a channel coder 309, a pilot coder 301, a channel decoder 311, spread demodulators 312 and 313, a rake receiver 314, a carrier modulator 315, a carrier demodulator 316, and an antenna 317.

In the circuitry shown in FIG. 3, the blocks constituting a receipt line serve to transfer a transmission phase difference between the base stations received from a mobile station, and in this sense play the role of phase difference reporting means. The channel decoder 311 determines, based on the result of error detection, a degree of reliability of the data received from the mobile station and then demodulated. In addition, the channel decoder 311 sends the degree of reliability to the MCC 102 as the reliability information mentioned earlier. The channel decoder 311 therefore serves as error detecting means and reliability information adding means at the same time.

Further, the frame assembler/offset corrector 306 corrects a difference in transmission phase between the base stations sent from the mobile station via the other bases station. This block 306 therefore serves as transmission frame phase correcting means. In addition, when the base station 103 currently holds the communication channel with the mobile station, the frame assembler/offset corrector 306 reports an ID code corresponding to the leading data of the next frame period, which is determined in consideration of a base station expected to newly set up a communication channel, to the new base station beforehand. The above block 306 therefore plays the role of ID code reporting means at the same time. In addition, when the base station 103 is expected to set up a communication channel with another mobile station, the block 306 generates the next frame on the basis of the ID code reported from the base station currently holding a communication channel. In this respect, the block 306 additionally serves as transmission frame generating means.

Figure 4:
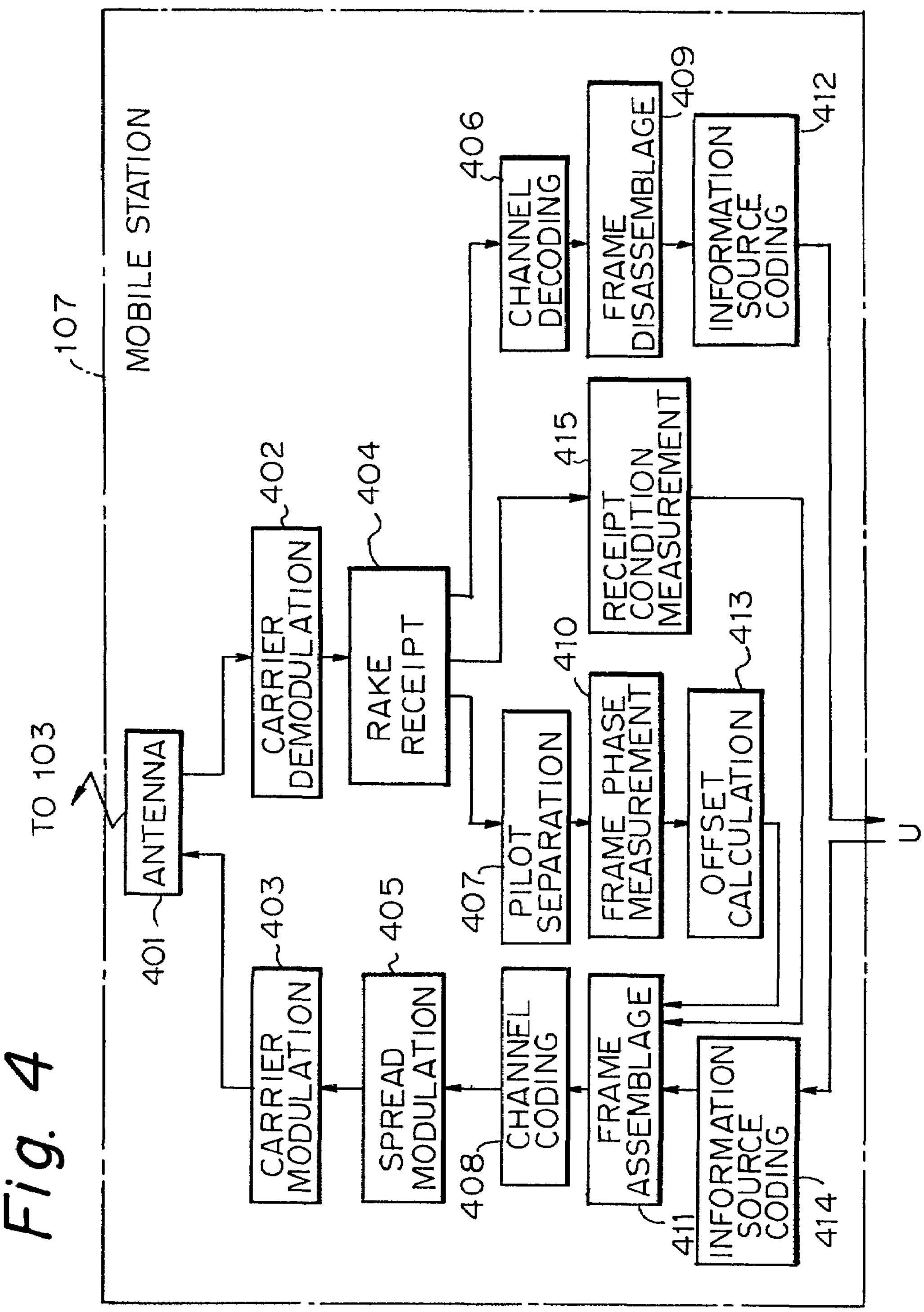
FIG. 4 is a schematic block diagram showing a mobile station further included in the embodiment.

The mobile stations 106–108 shown in FIG. 1 are identical in configuration. Reference will be made to FIG. 4 for describing a specific configuration of the mobile station 107 by way of example. As shown, the mobile station 107 has an antenna 401, a carrier demodulator 402, a carrier modulator 403, a rake receiver 404, a spread modulator 405, a channel decoder 406, a pilot separator 407, a channel coder 408, a frame disassembler 409, a frame phase measurer 410, a frame assembler 411, an information source decoder 412, an offset calculator 413, an information source coder 414, and a receipt condition measurer 415.

In the circuitry shown in FIG. 4, the offset calculator 413 determines a difference in transmission phase between a plurality of base stations, and in this sense plays the role of phase difference determining means. The frame assembler 411 reports the determined phase difference information to the base stations, and therefore serves as transmission phase difference reporting means. The rake receiver 404 receives signals sent from a plurality of base stations, e.g., a base station currently holding a communication channel with the mobile station 107 and a base station expected to newly set up a communication channel. The rake receiver 404 combines, based on the maximum ratio, the two received signals and demodulates them, and in this respect serves as received signal demodulating means. The receipt condition measurer or measuring means 415 measures the receipt conditions (SN ratio and received power) of the signal sent from the individual base station. The frame assembler 411 additionally plays the role of receipt condition reporting means, i.e., reports the receipt conditions measured by the measurement 415 to the base station currently holding a communication channel with the mobile station 107 as receipt condition information.

The CDMA communication system having the above construction operates, as follows. First, a down-going link procedure and an up-going link procedure to be executed by the MCC 102 will be described. On the down-going link, data of a plurality of connections between terminals are multiplexed by time division on the network 101 and sent to the MCC 102. In the MCC 102, the channel demultiplexer 201 demultiplexes the multiplexed received data into the channel assigned to the MCC 102 (own channel hereinafter) and the other channels (OTCHa). The own channel is input to the time stamp adder 203. The time stamp adder 203 adds a time stamp to every predetermined amount of data. For example, in a layered architecture allowing a plurality of communication connections to share a single ATM cell, use is made of a short cell, and a sequence number is added to the short cell connection by connection for the same amount of data. In the illustrative embodiment the sequence number is implemented as a time stamp. The time stamp is reset at the period of 10 milliseconds between the base stations and the mobile stations and is cyclically used.

It is to be noted that the protocol of a data link layer particular to the communication network 101 is terminated at each of the channel demultiplexer 201 and time stamp adder 203, implementing the protocol of the data link layer of the system.

The data with the time stamp is fed from the time stamp adder 203 to the multicast 205. In addition, communication data interchanged between terminals belonging to the system are folded back by the path selection 207 and then input to the multicast 205. The multicast 205 recognizes the connection to effect handover between the base stations by searching the handover memory table 205, effects multicast for the connection, and hands over the individual data to the path selector 208. The path selector 208 distributes the multicast data to a plurality of base stations relating to the handover. However, if the data is the data of a connection not relating to handover, the multicast 205 simply hands over the data to the path selector 208 without performing multicast.

The channel multiplexers/clock inserters 211 and 212 receive one or more of the connections of the own channel assigned to the MCC 102 and the other channels (OTCHb), multiplex them, and send the multiplexed connections to the base stations 103 and 104. At this instant, a clock output from the clock generator 209 is inserted in the multiplexed connections as a synchronizing signal. For example, when the transmission rate is 1.544 megabits per second (Mbps), the above clock has a bit rate of 8 kilobits per second (kbps).

As for the up-going link of the MCC 102, multiplexed data sent from the base stations 103 and 104 are input to the clock separators/channel demultiplexers 213 and 214, respectively. The clock separator/channel demultiplexers 213 and 214 each separates a clock from the data received from the base station 103 or 104 and demultiplexes, based on the clock, the data meant for the MCC 102 from the data meant for the other channels (OTCHc). The data separated from the data of the other channels (OTCHc) by the above blocks 213 and 214 are routed through the selective combiner 210 to the path selector 207.

The selective combiner 210 searches the handover memory table 206 in order to determine a connection relating to the handover. At the time when the handover for the determined connection should be executed, the selective combiner 210 selectively combines the received data on a radio frame basis. This successfully implements the cell diversity effect, as will be described specifically later.

On receiving the above data, the path selector 207 determines whether the terminal to receive the data is connected to this communication system or whether it must be connected to the communication system via the network 101. If the data is meant for a terminal connected to the system, the path selector 207 folds back the data and inputs it to the multicast 205, as stated earlier. If the terminal must be connected to the system via the network 101, the time stamp separator 204 terminates the protocol of the system. In this case, the channel multiplexer 202 converts the signal of the own channel and the signals of the other channels (OTCHd) in conformity to the protocol of the network 101.

The base station 103 performs the following operations for its down-going link and up-going link. As for the down-going link, the multiplexed data are input to the clock separator/channel demultiplexer 301. The clock separator/channel demultiplexer 301 demultiplexes the data into the channel assigned to the base station 103 (own channel hereinafter) and the other channels (OTCHe), and matches the clock particular to the base station 103 to the clock synchronizer 304. For this purpose, use is made of a phase-locked loop (PLL hereinafter). Because the clock of the base station 103 is identical with the clock of the MCC 102 except for a phase delay ascribable to transmission, the base station 103 is capable of counting the same time as the MCC 102.

The data output from the clock separator/channel demultiplexer 301 are input to the time stamp separator 303. The time stamp separator 303 separates the time stamp from the input data and then feeds the data to the frame assembler/offset corrector 306. The frame assembler/offset corrector 306 constructs the input data into a frame which is a unit to be sent in the radio section. The channel coder 309 executes convolutional coding and interleaving or similar error correction coding with the above frame of data The data that have undergone the error correction coding are spread up to the spread bandwidth by the spread modulator 312. For example, assuming that the symbol rate after error correction is 64 kilosymbols per second (ksps), then the spread modulator 312 spreads it by 64 times and thereby outputs a signal of 4.096 megachips per second (Mcps), i.e., belonging to a spread bandwidth of 5 MHz.

On the other hand, the clock separated by the clock separator/channel demultiplexer 301 is input to and counted by the frame period generator 307. The clock is used to calculate a frame period. The output of the frame period generator 307 is applied to the pilot coder 310 using a suitable coding scheme, and transformed to a pilot signal thereby. The spread modulator 313 spreads the pilot signal output from the pilot coder 310 up to the spread bandwidth. The carrier modulator 315 combines the spread pilot signal output from the modulator 313, the spread user signal output from the modulator 312, and spread user signals input via the other channels (OTCHf), modulates the composite signal to a radio frequency, and then radiates the radio frequency signal via the antenna 317, i.e., sends it to the mobile station 107 existing in the cell.

The up-going link operation of the base station 103 is as follows. The base station 103 receives signals sent from a plurality of mobile stations via radio channels with its antenna 317. In the base station 103, the carrier demodulator 316 demodulates the received signals and thereby outputs a spread band signal of the own channel and spread band signals of the other channels (OTCHg). The demodulated signal meant for the base station 103 is input to the rake receiver 314. The rake receiver 314 executes both the correction of phase rotation ascribable to fading and the multipath combination together with inverse spread with the demodulated signal. As a result, the received signal is demodulated to a signal lying in the baseband.

The channel demodulator 311 executes deinterleaving and Viterbi decoding or similar error correction with the above baseband signal. The frame disassembler 308 decomposes the data that has undergone error correction from the radio frame. Consequently, the radio interface is terminated.

The time stamp adder 305 adds a time stamp to the data output from the frame disassembler 308 every predetermined amount of data. The unit amount of data to which a time stamp is added will be referred to as a miniframe hereinafter. For example, assuming that data are sent at a rate of 32 kbps, and that the unit of the miniframe is 1 millisecond, then a time stamp is added to 4 bytes of user data. The channel multiplexer/clock inserter 302 multiplexes the above data with the time stamp and the other channels (OHCHh), inserts the clock, and then sends them to the MCC 102.

The down-going link operation and up-going link operation of the mobile station 107 are as follows. As for the down-going link, the mobile station 107 receives a spread signal via the antenna 401 and a radio transmission path. The received signal is input to carrier demodulator 402 and demodulated to a signal lying in the spread band thereby. The rake receiver 404 inversely spreads the demodulated signal to output a corresponding baseband signal. The rake receiver 404 corrects phase rotation ascribable to fading caused by the movement of the mobile station 107, and combines multipath components ascribable to reflections from, e.g., buildings on the radio transmission path, thereby improving the receipt gain.

The channel demodulator 406 executes deinterleaving and Viterbi decoding or similar error correction with the baseband signal output from the rake receiver 404. The frame disassembler 406 removes a header and other symbols from the data that has undergone the error correction and thereby produces user data. The information source decoder 412 transforms the user data such that the user (U) of the mobile station 107 can recognize it. For example, assuming that the data sent is representative of a speech, then the decoder 412 decodes the speech-coded data by, e.g., G719 or 32k-ADPCM so as to reproduce a speech signal.

As for the up-going link of the mobile station 107, information input by the user is converted to digital data by the information source coder 414. This conversion will not be effected if a digital signal is directly input by the user. On receiving the digital signal, the frame assembler 411 slices it into unit data to be sent to the radio transmission path. The channel coder 408 executes convolutional coding and interleaving or similar error correction coding with the output data of the frame assembler 411. The spread modulator 405 spreads the data output from the channel coder 408 to the spread bandwidth. The carrier modulator 403 further modulates the spread band data to the radio frequency band. The resulting radio frequency band data is radiated to the radio transmission path via the antenna 401.

The operation of the CDMA communication system relating to soft handover will be described hereinafter. For the two base stations 103 and 104 and mobile station 107 located as shown in FIG. 1 to perform soft handover, the following prerequisites must be met on the down-going link. First, the radio frames of 10 milliseconds sent from the base stations 103 and 104 belonging to the MCC 102 as to clock must be matched in phase. Second, the same information to be sent to the base stations 103 and 104 must be loaded in the radio frames of the same timing. In addition, such procedures must be executed with a minimum of delay. Under these conditions, the rake receiver 404 of the mobile station 107 implements receipt based on the maximum ratio combination.

As for the down-going link, the following prerequisites must be met. First, both the base stations 103 and 104 must receive a frame sent from the mobile station 107, execute error detection with the received frame by cyclic redundancy check (CRC hereinafter), and add the results of error detection as a one-bit reliability information. Second, the MCC 102 performs selective combination on the basis of the reliability information received from the base stations 103 and 104.

A soft handover procedure on the down-going link will be described with reference to FIGS. 5–9. Briefly, this procedure is divided into two different operations, i.e., a first operation for synchronizing transmission phases (steps S1 and S2, FIG. 5), and a second operation for loading the same data in frames to be sent from a plurality of base stations relating to the switching of the frame (steps S3 and S4, FIG. 5).

Figure 6:
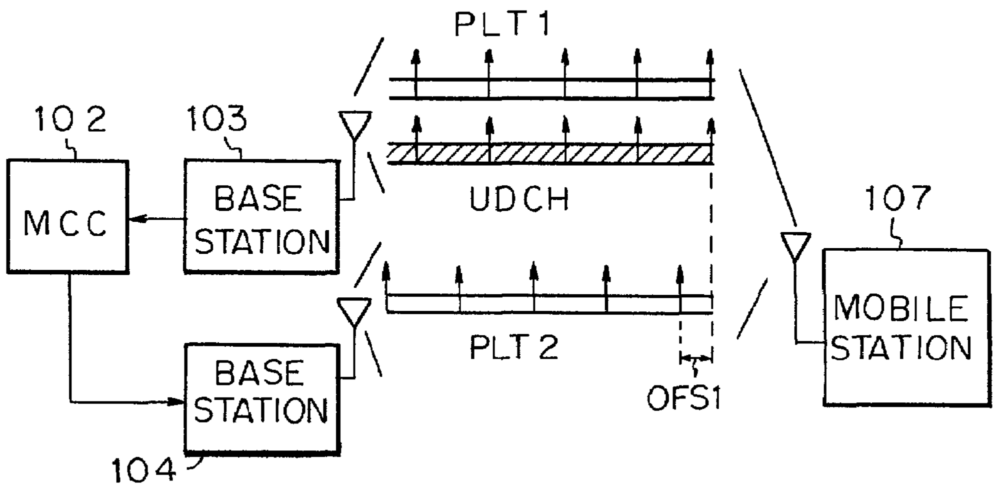
FIG. 6 shows how an offset is detected and reported in the embodiment.
Figure 7:
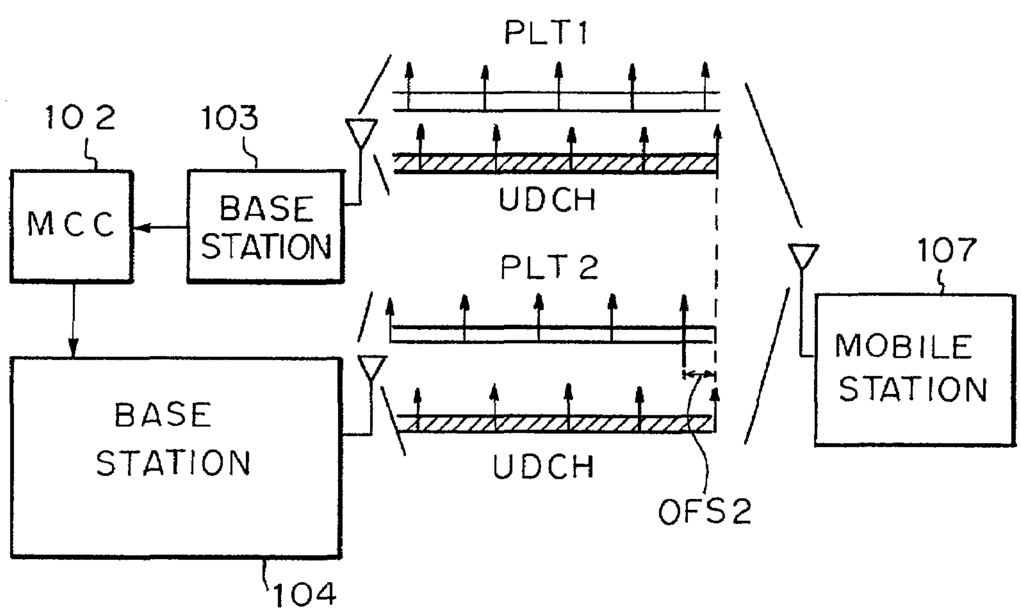
FIG. 7 shows how a transmission phase is corrected on the basis of the reported offset.

Reference will be made to FIGS. 6 and 7 for describing the first operation in detail. FIGS. 6 and 7 show a specific procedure in which the base station 104 matches the phase of its radio frame to the phase of the radio frame of the base station 103. Each of the base stations 103 and 104 includes its own frame period generation 307, and each executes spread modulation with the pilot signal (PLT 1 or PLT2) in the respective frame phase and sends the modulated pilot signal.

To set up a call between the base station 103 and the mobile station 107, the frame assembler/offset corrector 306 of the base station 103 forms a user information frame in accordance with the phase of the frame period generator 307. As shown in FIG. 6, in the event of handover, the mobile station 107 measures a phase difference (offset OFS 1) between the pilot signals PLT 1 and PLT2 of the base stations 103 and 104, and reports it to the base station 103 communicating with the mobile station 107 (step S1).

More specifically, in the mobile station 107, the rake receiver 404 inversely spreads the spread band signal with the spread codes of the pilot signals PLT1 and PLT2 and thereby outputs a baseband signal. The pilot separator 407 separates the pilot signals PLT1 and PLT2 from the baseband signal. The frame phase measurer 410 measures the phases of the pilot signals PLT1 and PLT2 and delivers the measured phases to the offset calculator 413. In response, the offset calculator 413 produces a phase difference between the pilot signals PLT1 and PLT2. In this connection, the pilot separation 407 is implemented by a filter using an integrating circuit and removing long period fluctuation ascribable to fading. The offset OFS1 is measured and calculated with the spread modulation chip of the spread modulation 405 being used as a unit.

Figure 5:
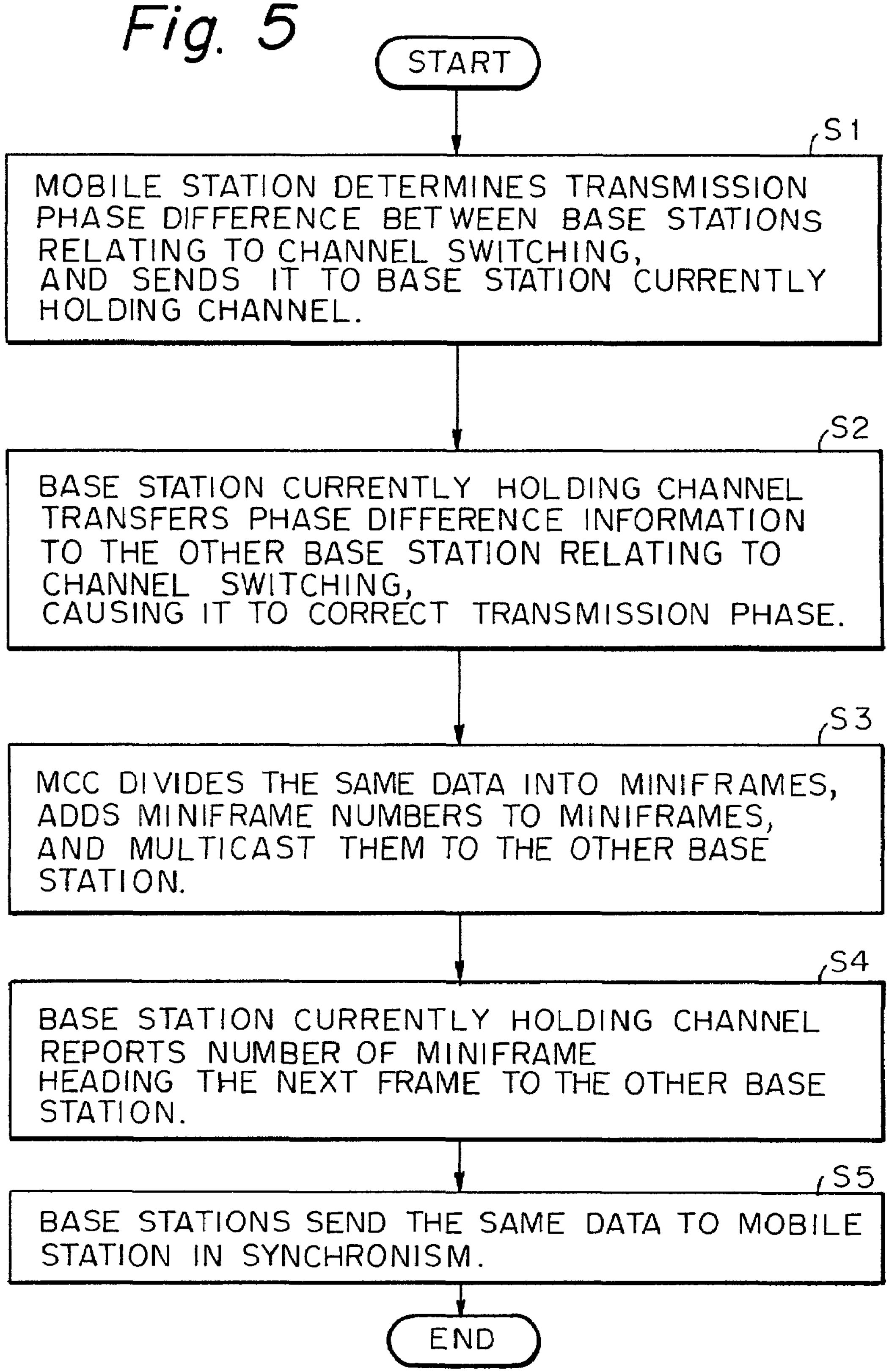
FIG. 5 is a flowchart demonstrating a communication channel switching control procedure particular to the embodiment.

After the offset OFS 1 has been sent to the base station 103, the step S2 shown in FIG. 5 is executed. Specifically, as shown in FIG. 7, the offset information is sent to the base station 104 by way of the base station 103 and MCC 102. The offset information is input to the frame assembler/offset corrector 306 included in the base station 104. The frame assembler/offset corrector 306 corrects the transmission phase of the base station 104 by the offset (OFS2). The user data subjected to the correction is sent to the mobile station 107 via a user data channel UDCH. As a result, the radio frame of the base station 103 and that of the base station 104 are matched in phase.

Figure 8:
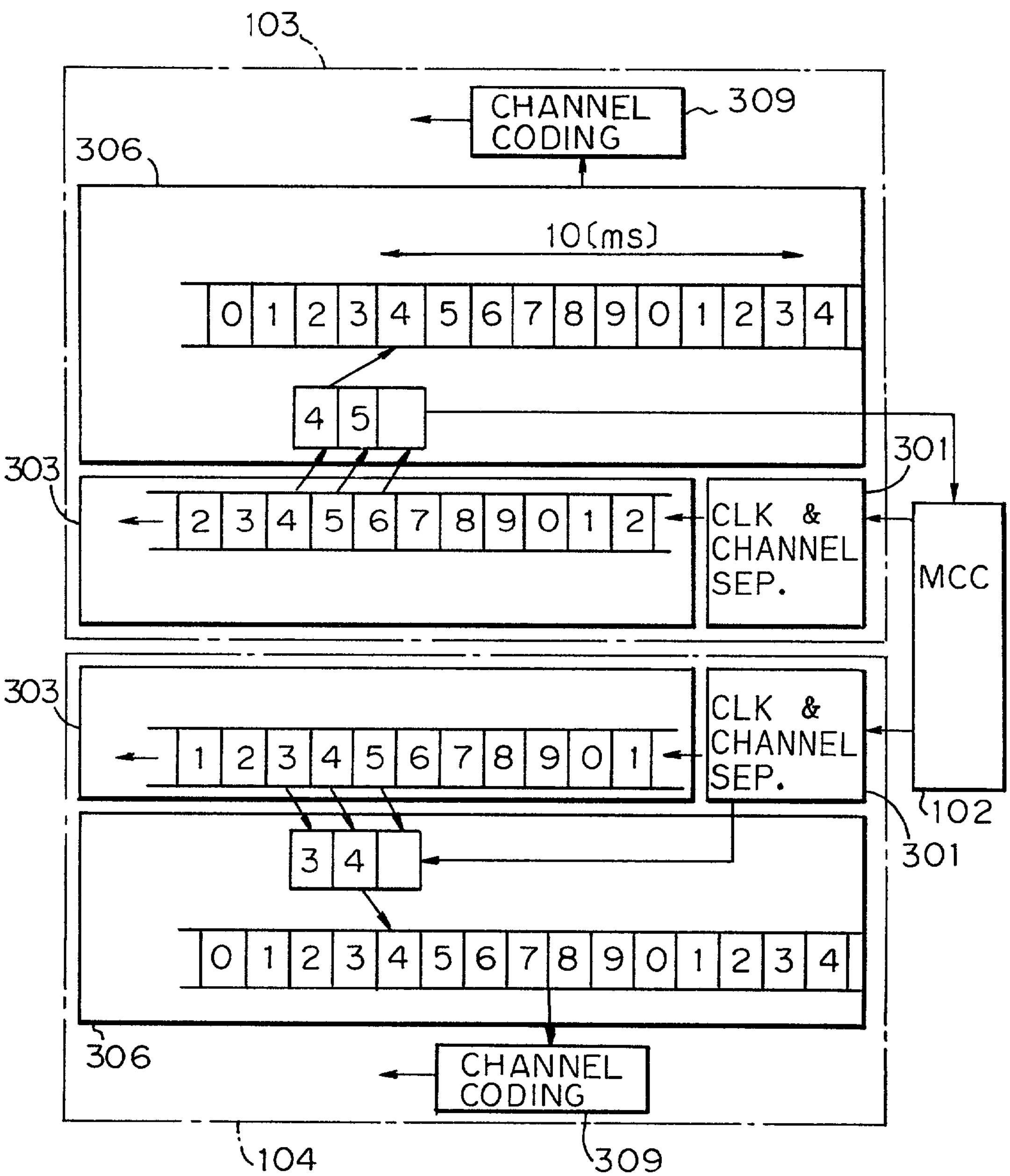
FIG. 8 shows how the identity of the contents of data is guaranteed between base stations by time stamps available with the embodiment.

The second operation will be described with reference to FIG. 8. FIG. 8 shows how the base stations 103 and 104 each construct a radio frame. In FIG. 8, let the unit to which a time stamp is added, i.e., 1 millisecond, be referred to as a miniframe. Also, assume that the MCC 102 is multicasting miniframes decomposed and provided with miniframe numbers (step S3).

In FIG. 8, the base station 103 currently holding communication via the communication channel constructs a frame by delaying the received data by one miniframe (less than three miniframes at most). Specifically, the base station 103 does not construct the next frame from a miniframe #5 already arrived at the station 103, but constructs it from a miniframe #4 arrived at the station 103 one miniframe before. This is to guarantee that the same information be delivered to the base station to join in the handover, i.e., the base station 104 shown in FIG. 8.

On deciding to construct a frame from the miniframe #4, the base station 103 informs the base station 104 of the miniframe number heading the frame via the MCC 102 (step S4). In response, the base station 104 constructs a frame. At the beginning of the handover, the base station 104 starts sending a frame beginning with the miniframe #4 in the same manner as the base station 103 (step S5).

The frame offset correction and the generation of a 10 millisecond radio frame based on the miniframe sequence number described above allow the rake receiver 404 of the mobile station 107 to perform diversity receipt.

It is to be noted that the MCC 102 determines the timing for switching the communication channel and the base station to be switched on the basis of the information returned from the mobile station 107 to the base station 103. Specifically, with the receipt condition measurer 415, the mobile station 107 constantly monitors the base stations to see if any one of them has receipt conditions comparable with or even superior to the receipt conditions of the base station of the channel being occupied for communication. The mobile station 107 returns the result of measurement in the form of a combination of the name (code) of a base station and its receipt conditions (including information relating to the base station currently in communication). This allows the MCC 102 to determine the base station to be switched and the timing for switching it.

Figure 9:
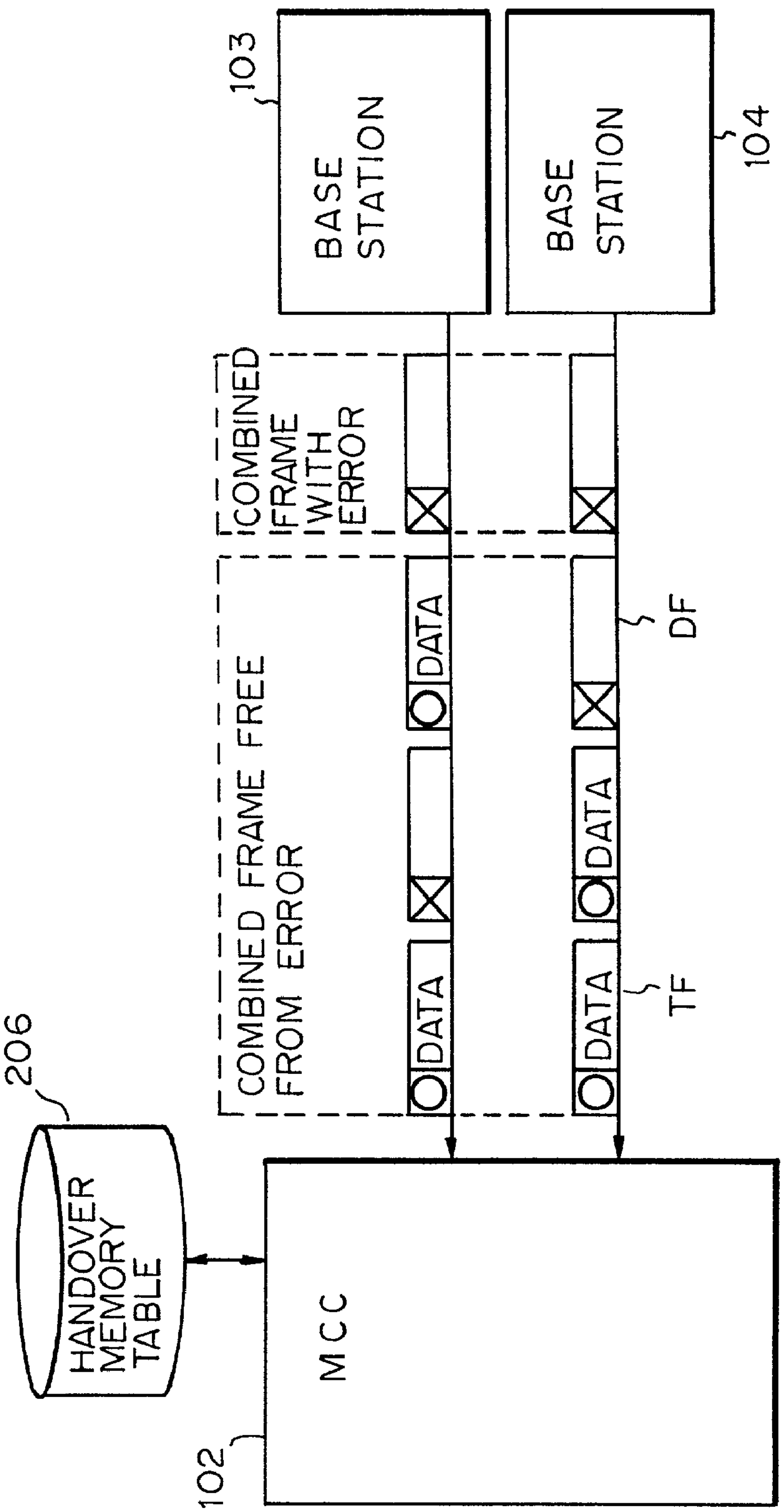
FIG. 9 demonstrates the selective combination of upgoing frames executed by the embodiment on the basis of reliability information.

An up-going link procedure relating to the handover is as follows. FIG. 9 demonstrates the operation of the selective combiner 210 included in the up-going link of the MCC 102. As shown, the base stations 103 and 104 each receive the radio frame sent from the mobile station 107 and execute error detection with the radio frame. Subsequently, the base stations 103 and 104 each add respective one-bit reliability information to the reconstructed frame and send the resulting frame to the MCC 102. The reliability information may be added to the header of a short cell.

At the time when the MCC 102 decides to execute the handover, the MCC 102 writes in the handover memory table 206 the connection number received from the mobile station 107 via the base station 103 and the connection number received from the same, but via the base station 104. The MCC 102 searches for the connection numbers contained in the multiplexed data received from the base stations 103 and 104 and thereby detects a connection relating to the handover. Specifically, the MCC 102 checks the reliability information of the data of the first connection. If the frame is a normal frame (TF), the MCC 102 selects the data of the first connection while, if it is a defective frame (DF), the MCC 102 waits a predetermined period of time until the data of the second connection arrives. Then, the MCC 102 checks the reliability information of the data of the second connection. If the combined frame is free from errors, the MCC 102 selects the data of the second connection. In this manner, the MCC 102 performs selective combination based on the reliability information.

The illustrative embodiment shown and described has the following unprecedented advantages. The CDMA communication system can be constructed without providing each of the communication network 101, MCC 102, base stations 103–105 and mobile stations 106–108 with a GPS receiver. The individual apparatus is therefore small size and low cost. Further, the system is free from the failure of soft handover and insures desirable speech communication and data communication. In addition, the number of mobile stations connectable to a single base station increases under adequate transmission power control because the ratio of mobile stations in a soft handover condition increases.

The illustrative embodiment eliminates the need for GPS receivers by providing all of the network 101, MCC 102, base stations 103–105 and mobile stations 106–108 with the function of guaranteeing the synchronization of the transmission phase. Alternatively, such a synchronizing function may be implemented by the conventional GPS receiver. Even with the GPS receiver scheme, it is possible to guarantee the identity of the data sent from the different base stations due to the time stamping function, and therefore to realize sure soft handover.

Further, in the above embodiment, to insure the identity of the contents of frames sent at the time of soft handover, the base stations joining in the handover report the leading data to each other. Alternatively, so long as the system is free from a time lag between the arrival of multicast data and ascribable to, e.g., transmission delay, the function of guaranteeing the identity of data may be omitted.

Figure 10:
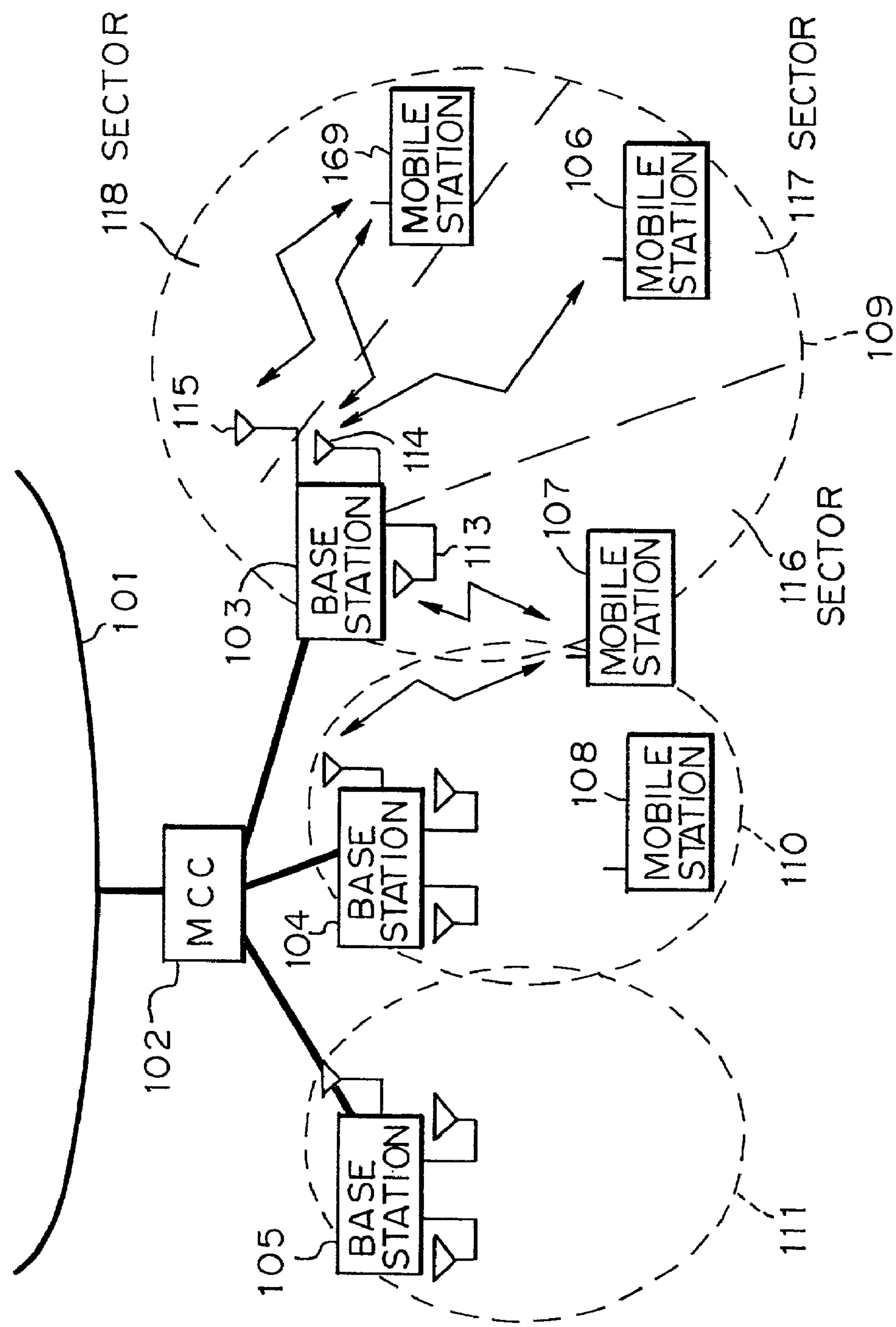
FIG. 10 shows an alternative embodiment of the present invention.

Referring to FIG. 10, an alternative embodiment of the CDMA communication system in accordance with the present invention will be described. As shown, the communication system has a mobile station 169 in addition to the communication network 101, MCC 102 connected to the network 101, base stations 103–105 connected to the MCC 102 by wired paths, and mobile stations 106–108 communicable with the base stations 103–105. As shown, the base stations 103–105 define the cells or service areas 109-111, respectively. In the illustrative embodiment, each cell is subdivided into three sectors or subcells 116, 117 and 118, as shown by taking the cell 109 as an example. The base stations 103–105 each have three directional antennas 113, 114 and 115 assigned to the sectors 116–118, respectively.

The MCC 102 and communication network 101 are interconnected by suitable transmission interfaces prescribed by the SDH, as in the previous embodiment. Again, as for transmission and switching between the network 101 and the MCC 102, either one of ATM and STM may be used, as desired.

The base stations 103–105 and MCC 102 are also interconnected by suitable transmission interfaces prescribed by the SDH, as in the previous embodiment. While transmission and switching between the MCC 102 and the base stations 103–105 may also be implemented by either one of ATM and STM, ATM requires each of the base stations 103–105 to include an ATM-STM converter and an STM-ATM converter on its down-going channel and up-going channel, respectively, as stated earlier.

The mobile stations 106–108 and 169 and base stations 103–105 change their destinations of connection on the basis of the relative positional relation. For example, in FIG. 10, the base station 106 is communicating with the base station 103, the base station 107 is in communication with the base stations 103 and 104 at the same time, and the mobile station 108 is not communicating with any one of the mobile stations 103–105, as in the previous embodiment. Further, the mobile station 169 is communicating with the base station 103 via the two directional antennas 114 and 115 of the station 103.

The mobile stations 106–108 and 169 each communicate with one of the base stations 103–105 from which a signal is received in the best condition over the radio transmission path. Therefore, the mobile stations 106–108 and 169 each switch the base station when moving from one cell to another cell. The occurrence that any one of the mobile stations 106–108 and 169 communicates with a plurality of base stations at the time of above switching is referred to as handover. Particularly, handover between the base stations will be referred to as base station handover for simplicity. In the specific case shown in FIG. 10, the condition of the mobile station 107 is the base station handover. The simultaneous communication of one mobile station with a plurality of base stations implements the cell diversity effect, i.e., reduces transmission power and therefore the interference with the other stations.

Likewise, every time any one of the mobile stations 106–108 and 169 moves from one sector to another sector belonging to the same cell, it switches the directional antenna setting the radio transmission path. Let the switching to occur when the mobile station moves over a plurality of sectors of the same cell be referred to as sector handover, as distinguished from the base station handover. In the specific case shown in FIG. 10, the condition of the mobile station 169 is the sector handover. In this manner, the cell diversity effect is achievable on the down-going link during sector handover as during base station handover, while diversity between the sectors, i.e., antenna diversity effect is achievable on the down-going link. The mobile stations 106–108 and 169 each communicate with a terminal connected to the network 101 via at least one of the base stations 103–105 and MCC 102, or communicate with another mobile station belonging to the same system again by way of one of the base stations 103–105 accommodated in the MCC 102.

Figure 11:
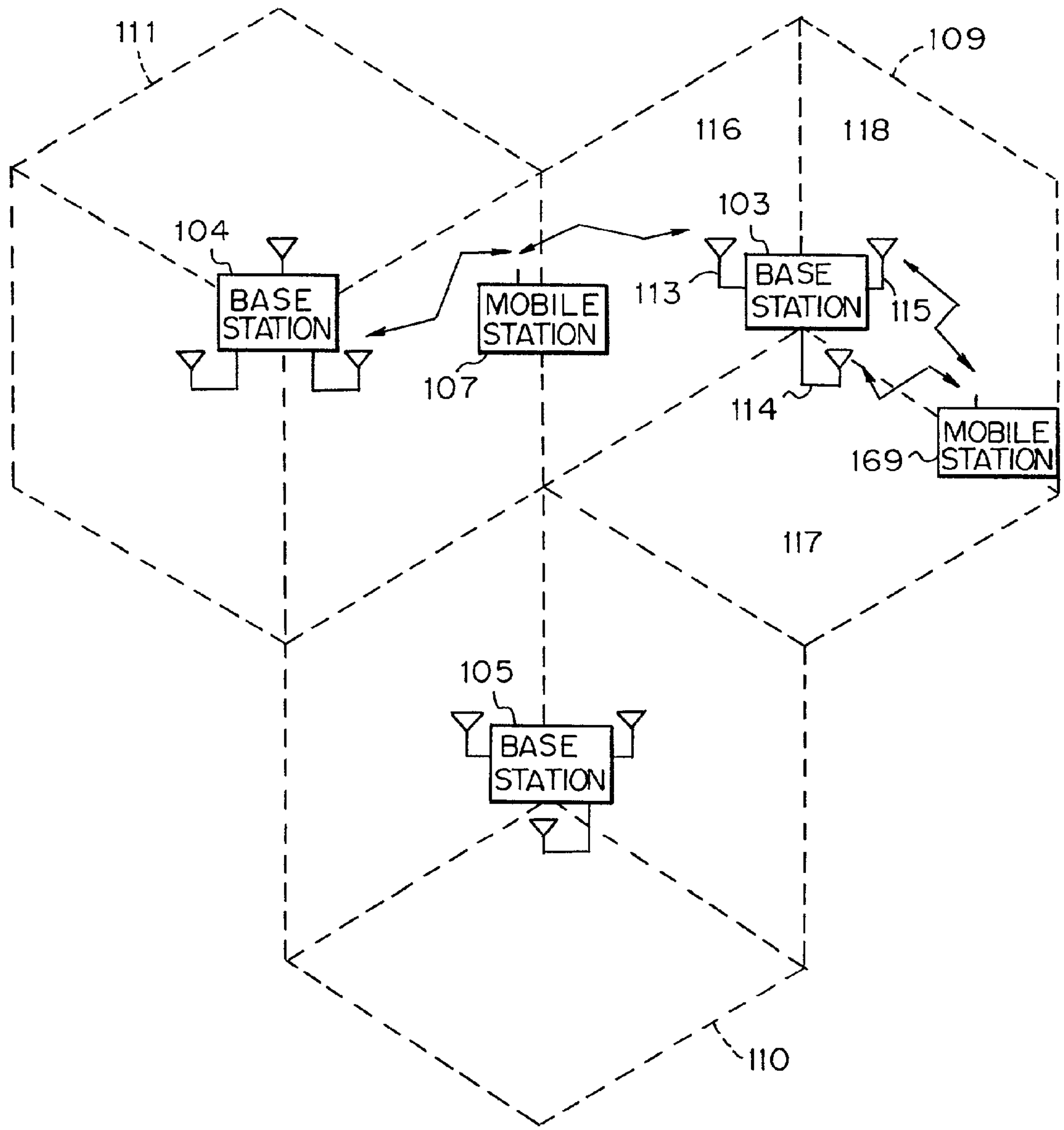
FIG. 11 shows a specific arrangement of base stations and sectors particular to the alternative embodiment.

FIG. 11 shows a specific arrangement of the base stations 103–105 and sectors belonging to the CDMA communication system of FIG. 10. The base stations 103–105 are shown as each having the three directional antennas 113–115. In practice, however, some of the base stations 103–105 may be provided with a single nondirectional antenna. While the following description concentrates on the base stations having directional antennas, the communication system is, of course, practicable even when nondirectional antennas exist together with directional antennas. This does not bring about any problem or contradiction in respect of the communication system or the arrangement of the base stations.

In FIG. 11, the cells 109–111 defined by the base stations 103–105 and adjoining each other are hexagonal, and each is divided into three sectors, as illustrated. The base stations 103–105 are each located such that any one of the three directional antennas 113–115 is directed toward the border point between the three sectors. Again, the mobile station 107 is in the base station handover condition, i.e., communicating with both the base stations 103 and 104. The mobile station 169 is in the sector handover condition, i.e., communicating with the base station 103 via the antennas 114 and 115 of the station 103.

Figure 12:
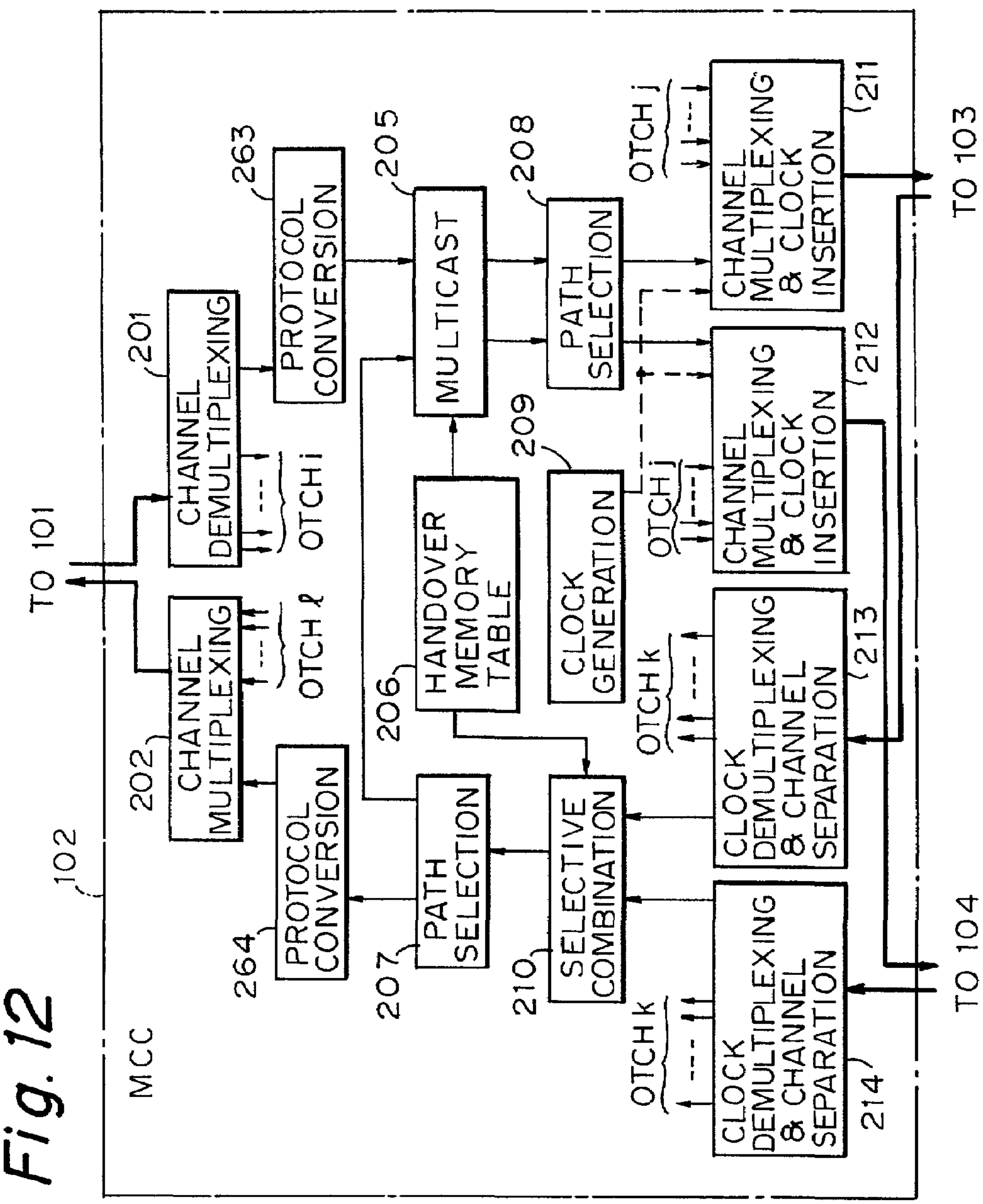
FIG. 12 is a block diagram schematically showing an MCC included in the alternative embodiment.

FIG. 12 shows a specific configuration of the MCC 102 included in the communication system of FIG. 10. In FIG. 12, the MCC 102 is assumed to be connected to the network 101 and base stations 103 and 104. The connection of the MCC 102 to the base station 105 and the circuitry associated therewith are not shown for simplicity. As shown, the MCC 102 is essentially identical with the MCC 102 shown in FIG. 2 except that protocol converters 263 and 264 are substituted for the time stamps 203 and 204. The MCC 102 constantly monitors the positional relation between the mobile stations 106–108 and 169 and the base stations 103–105. The MCC 102 determines the base station to join in base station handover or the antenna to join in sector handover on the basis of receipt condition information relating to the base stations or to the directional antennas sent from the mobile station, and the traffic of the individual base station. The each occurrence of the receipt condition information consists of the name (code) of the associated base station or that of the associated antenna and the receipt conditions provided in a pair.

At the time of base station handover, the multicast 205 included in the MCC 102 plays the role of means for multicasting information to a plurality of base stations relating to the handover. However, at the time of sector handover, the multicast 205 is prevented from functioning. Likewise, the selective combination 210 functions only when the base stations relating to the base station handover send data to the MCC 102. The other constituents of the MCC 102 shown in FIG. 12 operate in the same manner as described with reference to FIG. 2.

Figure 13:
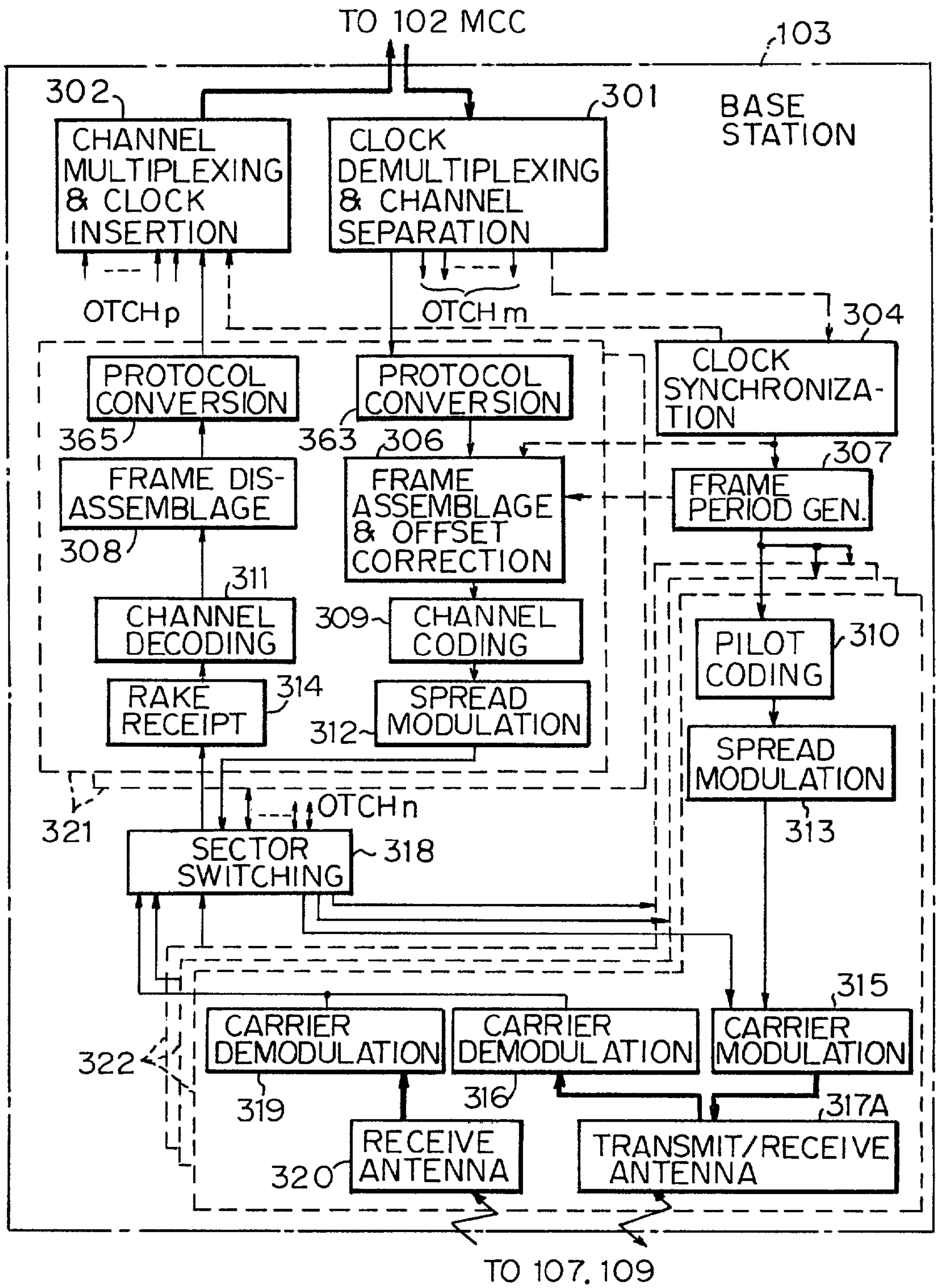
FIG. 13 is a block diagram schematically showing a base station also included in the alternative embodiment.

FIG. 13 shows a specific configuration of the base station 103 included in the communication system of FIG. 10. The other base stations 104 and 105 are identical in configuration with the base station 103. As shown, the base station 103 has the clock separator/channel demultiplexer 301, channel multiplexer/clock inserter 302, clock synchronizer 304, frame period generator 307, a sector switch 318, channel boards 321, and sector boards 322.

The channel boards 321 are provided in a number corresponding to the number of communication channels assigned to the base station 103. The channel boards 321 each have protocol converters 363 and 365 as well as the frame assembler/offset corrector 306, frame disassembler 308, channel coder 309, channel decoder 311, spread modulator 312, and rake receiver 314.

The sector boards 322 are provided in a number equal to the number of sectors constituting the cell 109 covered by the base station 103. Each sector board 322 has the pilot coder 310, spread modulator 313, carrier modulator 315, carrier demodulator 316, a transmission/receipt antenna 317A, a carrier demodulator 319, and a receipt antenna 320.

The channel boards 321 and sector boards 322 are the characteristic features of this embodiment. It is to be noted that the other constituents of the base station 103 operate substantially in the same manner as described with reference to FIG. 3.

Figure 14:
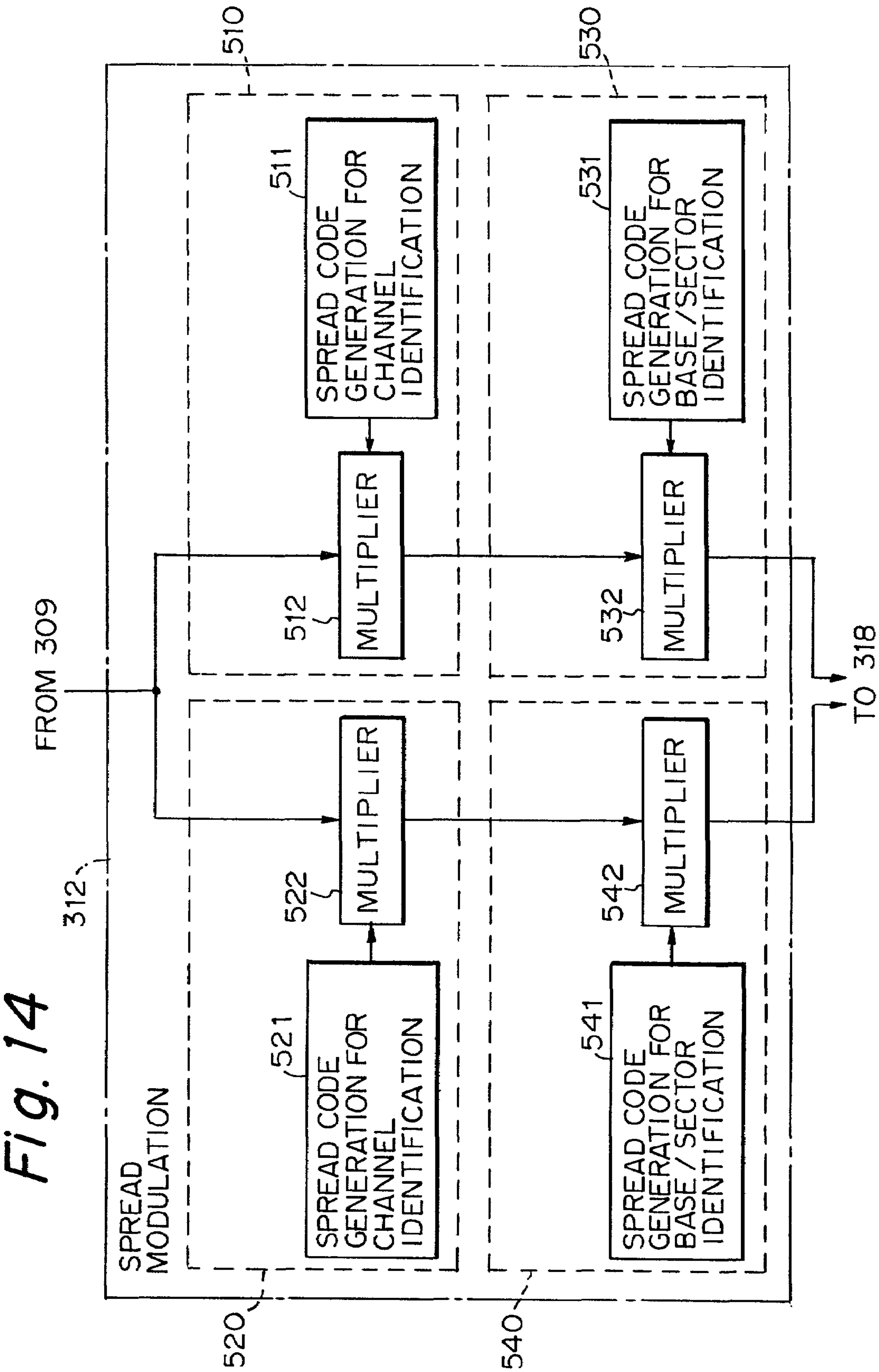
FIG. 14 is a block diagram schematically showing a specific configuration of a spread modulation circuit further included in the alternative embodiment.

FIG. 14 shows the spread modulator 312 included in each channel board 321 in detail. As shown, the spread modulator 312 has two independent processing lines because basically two sectors relate to handover at the same time. However, three or more different processing lines may be arranged in the spread modulator 312, if desired.

The two processing lines respectively have spread modulators 510 and 520 for channel identification and spread modulators 530 and 540 for base/sector identification. That is, each processing line has a first stage for performing multiplication using a first spread code different from one sector to another sector, and a second stage for performing multiplication using a second spread code different from one mobile station to another mobile station, i.e., from one channel to another channel. Therefore, the sectors belonging to the same cell are each capable of sending a modulated signal different from one mobile station to another mobile station.

The spread modulators 510 and 520 for channel identification respectively have multipliers 512 and 522 and spread code generators 511 and 521 for channel identification. The spread modulators 530 and 540 for base/sector identification respectively have multipliers 532 and 542 and spread code generators 531 and 541 for base/sector identification. In this connection, the multipliers 512, 522, 532 and 542 are implemented by Exclusive-OR gates (EXOR hereinafter).

Figure 15:
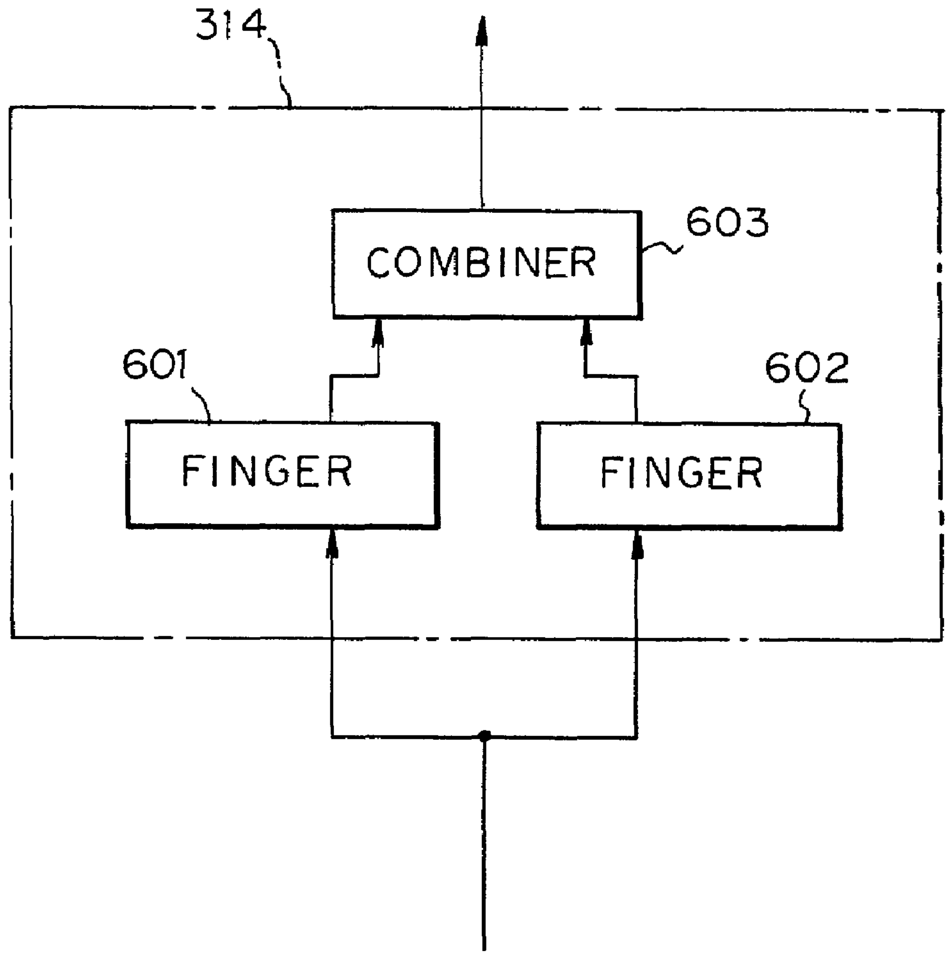
FIG. 15 is a schematic block diagram showing a specific configuration of a rake receipt circuit additionally included in the alternative embodiment.

FIG. 15 shows a specific configuration of the rake receiver 314 included in each channel board 321. As shown, the rake receiver 314 is made up of fingers 601 and 602 and a combiner 603. At the time of sector handover, the fingers 601 and 602 each inversely spread a received signal by using a respective spread code corresponding to a spread code assigned to a particular sector. In the event of base station handover, the fingers 601 and 602 each inversely spread a received signal by using the same spread code.

The mobile stations 106–108 and 169 included in the communication system shown in FIG. 10 are also provided with the configuration described with reference to FIG. 4, except for the following. In the event of sector handover unique to this embodiment, the rake receiver 404 is used to combine and demodulate signals coming in through two directional antennas corresponding to two sectors of the same cell. The combining operation during sector handover is exactly the same as during base station handover. The receipt condition measurer 415 of the mobile station 107 measures the receipt conditions (SN ratio and receipt power) of each of the signals coming in through a plurality of directional antennas, and sends it to the base stations as receipt condition information. It is to be noted that the directional antennas of the mobile station 107 may each belong to a different base station or may belong to the same base station.

At the time of handover, data flow on the down-going link and up-going link as follows. First, the operation of the MCC 102 relating to the down-going link will be described. The communication network 101 multiplexes data of a plurality of connections between terminals by time division multiplexing and sends the multiplexed data to the MCC 102. In the MCC 102, the channel demultiplexer 201 demultiplexes the received data channel by channel (OTCHi). The channel demultiplexer 201 and protocol converter 263 terminate the protocol of the data link layer included in the communication network 101. Then, the protocol of the data link layer included in the communication system begins.

The data output from the protocol converter 263 are input to the multicast 205. Communication data between terminals belonging to the communication system are folded back by the path selector 207 and also input to the multicast 205. The multicast 205 searches the handover memory table 206 in order to determine the connections to effect base station handover, and then executes the multicast of the data to the above connections. Subsequently, the data are input to the path selector 208.

The path selector 208 distributes the multicast data to a plurality of base stations relating to the base station handover. The data of connections not joining in the handover are directly fed from the multicast 205 to the path selector 208 without being multicast. At the time of sector handover, the multicast 205 searches the handover memory table 206 as at the time of base station handover. The difference is that in the event of sector handover the MCC 102 does not multicast the data, but uses a connection assigned to control signals and similar to a communication channel.

The channel multiplexer/clock inserters 211 and 212 receive the data of more than one connections via the own channel assigned to the MCC 102 and other channels (OTCHj), multiplex them, and send the multiplexed data to the base stations 103 and 104. At this instant, the clock output from the clock generator 209 is inserted in the data as a synchronizing signal. For example, when the transmission rate is 1.544 Mbps, the clock has a bit rate of 8 kbps.

As for the up-going link, the MCC 102 performs the following operation. Multiplexed data received from the base stations 103 and 104 are respectively input to the clock separator/channel demultiplexers 213 and 214. The demultiplexers 213 and 214 separates the received data into the data meant for the own channel and the data meant for the other channels (OTCHk) on the basis of the clock separated from the received data. The data on the separated channels are routed through the selective combiner 210 to the path selector 207.

The selective combiner 210 searches for connections to join in the base station handover by looking up the handover memory table 206. At the time of handover of the connections searched for, the combiner 210 selectively combines the received data on a radio frame basis and thereby achieves the cell diversity effect. The path selector 207 that received the data determines whether the terminal expected to receive the data is connected to the communication system or whether it should be connected to the communication system via the network 101. If the terminal is connected to the communication system, the path selector 207 folds back the data and inputs them to the multicast 205, as stated earlier. If the terminal should be connected to the communication system via the network 101, the protocol converter 264 terminates the protocol of the communication system while the channel multiplexer 202 converts the signals of the own channel and the other channels (OTCHi) in conformity to the protocol of the network 101.

A down-going link operation which the base station 103 performs at the time of handover is as follows. The multiplexed data sent from the MCC 102 are input to the clock separator/channel demultiplexer 301. The demultiplexer 301 separates the received data into the data meant for the own channel assigned to the base station 103 and the data meant for the other channels (OTCHm). In addition, the demultiplexer 301 matches the clock of the base station to the clock synchronizer 304, referencing the separated clock. For this purpose, a PLL is used. Because the clock of the base station 103 is identical with the clock of the MCC 102 except for a phase delay ascribable to transmission, the base station 103 is capable of counting the same time as the MCC 102.

The data output from the clock separator/channel demultiplexer 301 are input to one channel board 321. The other communication data are respectively input to the other channel board 321. In the channel board 321, the protocol converter 363 terminates the protocol set up on the transmission path between the MCC 102 and the base station 103. The frame assembly and offset corrector 306 constructs the data of the own channel and other channels (OTCHm) output from the demultiplexer 301 into a frame. The channel coder 309 executes convolutional coding and interleaving or similar error correction coding with the frame. Subsequently, the spread modulator 312 spreads the coded frame to the spread bandwidth. For example, the modulator 312 spreads the error corrected symbol rate of 64 ksps by sixty-four times so as to output a 4.096 Mcps signal, i.e., a spread band of 5 MHz.

As shown in FIG. 14, the illustrative embodiment executes double spread modulation, i.e., spread modulation for channel identification and spread modulation for base/sector identification. In the following description, the spread code for channel identification and the spread code for base/sector identification will be referred to as a short code and a long code, respectively. Spreading data by the long code reduces interference from the adjoining base stations or the adjoining sectors while spreading data by the short code implements multiconnection.

The two independent lines constituting the spread modulator 312 implement sector handover. When sector handover is not effected, one of the two lines is not used; the long code is implemented by a code particular to the base station/sector while the short code is allocated every time connection is set up. In the event of sector handover, the two lines each perform spread modulation by using a long code particular to the base/sector and suitable for the respective communication and a short code assigned to the respective base station/sector.

The user signal that has undergone the above spread modulation is input to the sector switch 318 together with the other spread user signals. The sector switch 318 switches the user signal of the own channel and the user signals of the other channels (OTCHn) to a sector suitable for communication and designated by the MCC 102. The carrier modulator 315 assigned to the sector selected modulates the user signal to a radio frequency. The demodulated user signal is sent to the mobile stations 107 and 109 via the transmission/receipt antenna 317A. On the other hand, the frame period generator 307 counts the clock separated by the clock separator and channel demultiplexer 301, thereby calculating a frame period. The frame period is fed to the sector board 222.

In the sector board 322, the pilot coder 310 generates a suitable pilot signal in the form of a code on the basis of the input frame period. The spread modulator 313 spreads the pilot signal to the spread band. The carrier modulator 315 modulates the spread pilot signal to a radio frequency. The modulated spread pilot signal is radiated via the transmission/receive antenna 317A as sector information together with the user signal.

As for an up-going link, the base station 103 receives signals sent from the mobile stations 107 and 109 with the transmission/receipt antenna 317A and receipt antenna 320. In the base station 103, the carrier demodulators 316 and 319 demodulate the received signals so as to output signals lying in the spread band. The demodulated signals are fed from the demodulators 316 and 319 to the channel board 321 via the sector switch 318.

In the channel board 321, the rake receiver 314 executes the correction of phase rotation due to fading and the multipath combination together with inverse spreading with the input signals lying in the spread band. As a result, the spread band signals are demodulated and turn out baseband signals.

When sector handover is not effected, the transmission/receipt antenna 317A and receipt antenna 320 are used in a pair connected to the same sector, implementing antenna diversity. In the event of sector handover, either one of the antennas 317A and 320 is connected to a different sector in order to use sector diversity.

The channel decoder 311 included in the channel board 321 executes deinterleaving and Viterbi coding or similar error correction. The frame disassembler 308 decomposes the radio frame and terminates the radio interface. The protocol converter 365 transforms the data output from the frame disassembler 308 to the transmission protocol between the base station 103 and the MCC 102. The channel multiplexer/clock inserter 302 multiplexes the data undergone protocol conversion with the data of the other channels (OTCHp) while inserting the clock therein. The multiplexed data with the clock are sent to the MCC 102.

The mobile station 107 performs the following down-going link operation. The mobile station 107 receives the spread signal with its antenna 401. The carrier demodulator 402 demodulates the signal to a signal lying in the spread band. The rake receiver 404 inversely spreads the spread band signal in order to output a baseband signal. The rake receiver 404 corrects the phase rotation ascribable to fading occurred during the movement of the mobile station 107, and combines multipath components ascribable to, e.g., reflections from buildings present on the radio transmission path, thereby improving the receipt gain.

The channel decoder 406 performs deinterleaving and Viterbi coding or similar error correction with the baseband signal output from the rake receiver 404. The frame disassembler 406 removes the header and other symbols from the data that has undergone error correction and thereby outputs user data. The information source decoder 412 transforms the user data to a condition which the user (U) can recognize. For example, when the data to be transmitted is speech data, the decoder 412 decodes speech-coded data and outputs the resulting speech signal.

As for the up-going link, the information source coder 414 of the mobile station 107 digitizes information input by the user. Of course, the digitization will not occur when the user directly inputs a digital signal in the mobile station 107. The frame assembler 411 slices the digital signal into data units. The channel coder 408 executes convolutional coding and deinterleaving or similar error correction coding with the data output from the frame assembly 411. The spread modulator 405 spreads the coded data output from the channel coding 408 to the spread bandwidth. Further, the carrier modulator 403 modulates the spread band data to the radio frequency band. The data lying in the radio frequency band are radiated to the radio transmission path via the antenna 401.

Figure 16:
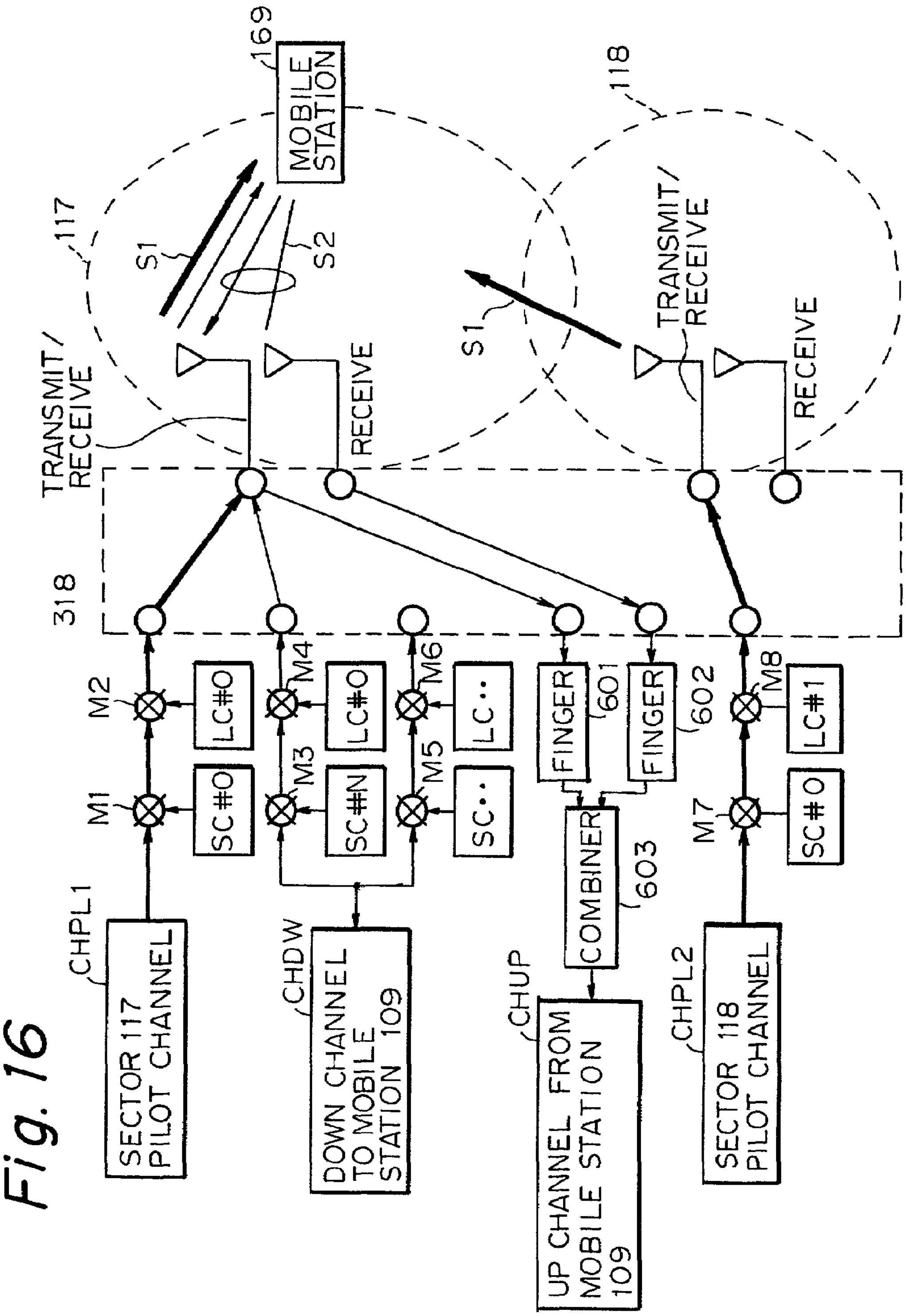
FIGS. 16, 17 and 18 each shows the alternative embodiment in a particular condition relating to handover between sectors.
Figure 17:
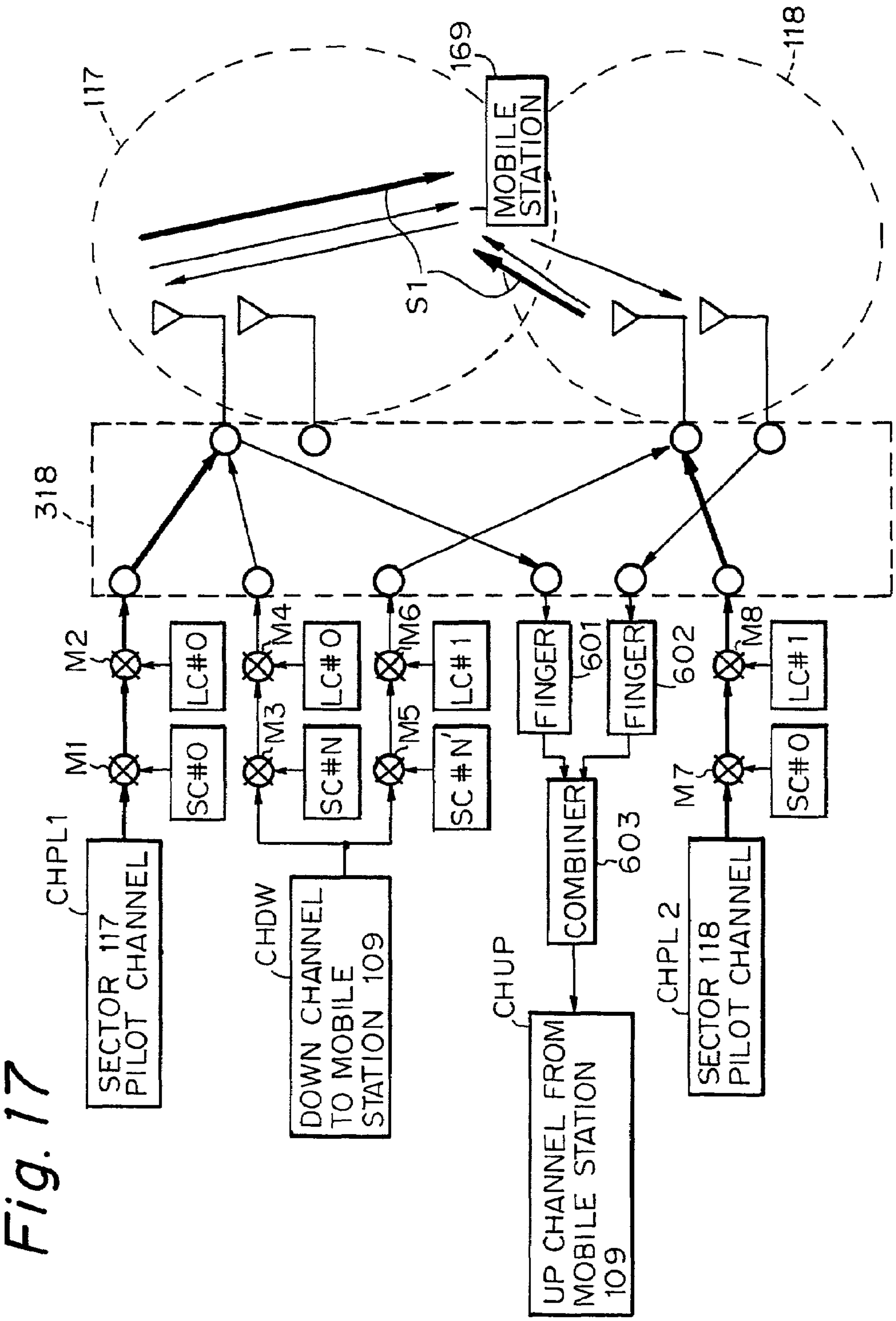
Figure 18:
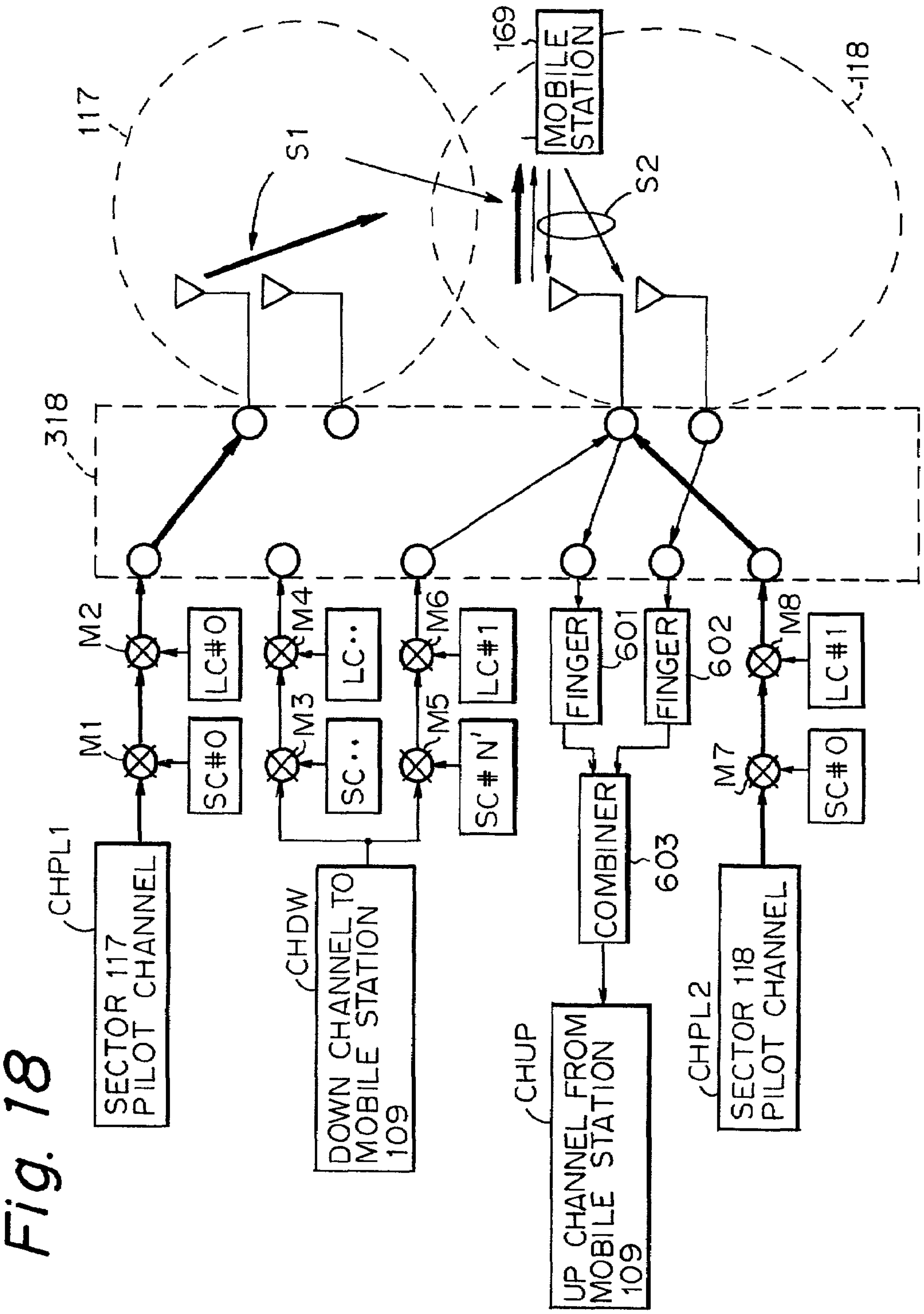

How the various stations, each executing a particular procedure as described above, operate as a system at the time of sector handover will be described with reference to FIGS. 16, 17 and 18. FIGS. 16, 17 and 18 respectively show a condition before sector handover, a condition during the handover, and a condition after the handover.

First, prerequisites with sector handover will be described. In the following description, the mobile station 169 is assumed to effect sector handover from the sector 117 to which the directional antenna 114 of the base station 103 is assigned to the sector 118 to which the directional antenna 115 of the same station 103 is assigned by way of example. As for the down-going link, the prerequisite with the sector handover is that the data sent from the MCC 102 to the base station 103 in one line be split into two, one for the sector 117 and the other for the sector 118. As for the up-going link, the prerequisite is that the sectors 117 and 118 receive a signal sent from the mobile station 169, and that the base station 103 selects one of multipath components contained in the individual signal and having suitable receipt conditions and causes its rake receiver 314 to execute maximum ratio combination.

It is to be noted that the pilot signal is a signal particular to the sector and therefore sent with constant power. For the short code of the pilot signal, use is made of the same code throughout the base stations and sectors. In FIGS. 16–18, the short code of the pilot signal CHPL1 or CHPL2 is denoted by SC#0 while the long codes of the sectors 117 and 118 are denoted by LC#0 and LC#1, respectively. Multipliers M1 and M2 multiply the pilot channel CHPL1 of the sector 117 by the short code SH#0 and long code LC#0, respectively. Multipliers M3, M4, M5 and M6 multiply a down-going channel CHDW by the short code and long code. Multipliers M7 and M8 multiply the pilot channel CHPL2 of the sector 118 by the short code CH#0 and long code LC#1, respectively. While sector handover is under way, a single channel board 321 is used for the communication to a single mobile station, so that the down-going channel CHDW and an up-going channel CHUP shown in FIGS. 16–18 are implemented by a single channel board.

The condition before sector handover will be described with reference to FIG. 16. As shown, the base station 103 is sending signals via the transmission/receipt antenna assigned to the sector 117. At this instant, only one line of the spread modulator 312 is used. Let the short code used on the down-going channel be denoted by SC#N. The base station 103 receives a signal from the mobile station 169 with both of its transmission/receipt antenna and receipt antenna, using antenna diversity (S2). Specifically, received waves inversely spread by the fingers 601 and 602, FIG. 15, are input to the combiner 603. The combiner 603 combines the inversely spread waves while correcting their propagation delay. It is to be noted that the mobile station 169 is informed of the long code beforehand, but not informed of location information relating to the base stations or the sectors.

The mobile station 169 monitors the receipt conditions, i.e., the power strength and signal interference ratio (SIR hereinafter) of the pilot signals received from the individual base station (S1). The mobile station 619 reports the long code of the sector of the base station most adequate for communication. This report is transferred to the MCC 102 via the base station 103. In response, the MCC 102 determines, based on the received report and the current traffic of the individual base station and by referencing the handover memory table 206, which of base station handover and sector handover should be effected. In the illustrative embodiment, priority is given to sector handover in order to prevent the traffic from increasing.

As shown in FIG. 17, during sector handover, the two independent lines of the spread modulator 312 are used at the time of transmission. The signal on the additional line is spread by the long code LC#1 particular to the sector 118 and the short code SC#M suitably allocated by the MCC 102. The spread signal is fed from the sector switch 318 to the transmission/receipt antenna assigned to the sector 118 and sent via the antenna after carrier modulation.

For receipt, one of the fingers 601 and 602 connected to the transmission/receipt antenna or the receipt antenna of the sector 117 and inferior in receipt conditions than the other is switched to the antenna of the sector 118. In FIG. 17, the transmission/receipt antenna of the sector 117 is switched to the transmission/receipt antenna of the sector 118 by way of example.

Even during the sector handover, the mobile station 169 constantly monitors the receipt conditions of the pilot signals being sent from the base stations (S1). If the receipt conditions of the pilot signal from the sector currently in communication and the receipt conditions of the communication channel are good, the mobile station 169 sends a handover cancel request. The MCC 102 receives this request via the base station 103 and ends the sector handover.

As shown in FIG. 18, after the sector handover, one of the two sectors for which the handover cancel request output from the mobile station 169 is meant is selected. A procedure for ending transmission and receipt from the sector selected will be described hereinafter. In FIG. 18, the sector 117 is the sector to be cancelled by way of example. In this case, the sector switch 318 cancels the connection of a signal to be transmitted to the transmission/receipt antenna of the sector 117, and then connects the contact to the antenna of the sector 118 currently not used for receipt. The fingers 601 and 602 both are connected to the transmission/receipt antenna of the sector 118 as to the received signal.

By the above procedure, the communication system shown in FIG. 10 is capable of realizing continuous communication during sector handover in the same manner as during base station handover. During sector handover, the mobile station should only perform the same switching operation as during base station handover.

As stated above, the illustrative embodiment allows a cell to be actually subdivided into sectors even in the CDMA communication system. This successfully increases the number of mobile stations to be connected at the same time for a single base station. At the time of switching of sectors controlled by the same base station or by different base stations, soft handover free from momentary interruption is achievable and insures high communication quality.

Further, the mobile station is capable of communicating with a plurality of sectors at the same time, implementing the diversity effect. Therefore, the base station and mobile station each attains a receipt gain and needs a minimum of transmission power. It follows that interference to communication between the base station and another mobile station is reduced, allowing the number of mobile stations connected at the same time to be increased for a single sector.

Moreover, the embodiment gives priority to sector handover over base station handover and thereby prevents transmission efficiency between the MCC and the base station from being lowered. In addition, the CDMA system can be advantageously realized because only base stations need to be changed.

While the configuration of the sector switch 318 of the illustrative embodiment is not shown or described in detail, it may be constituted by a mechanical switching mechanism or an electrical switching mechanism, as desired. For the electrical switching mechanism, use may be made of a bus controlled switch. The three sectors constituting a single cell, as shown and described, is only illustrative and may be replaced with two sectors or four or more sectors. Each base station should only be provided with the same number of sector boards 322 as the number of sectors. While the multipliers 5112, 522, 532 and 542 of the spread modulation 312 are implemented by EXOR gates, they may use any other suitable rule.

The entire disclosure of Japanese patent application Nos. 317392/1996 and 341058/1996 respectively filed on Nov. 28, 1996 and Dec. 20, 1996 including the specifications, claims, accompanying drawings and abstracts of the disclosure is incorporated herein by reference in its entirety.

While the present invention has been described with reference to the particular illustrative embodiments, it is not to be restricted by those embodiments. It is to be appreciated that those skilled in the art can change or modify the embodiments without departing from the scope and spirit of the present invention.

What is claimed is:

1. A handover method in CDMA mobile communications for synchronizing a transmission phase of a first frame signal, which is transmitted from a first base station currently holding a communication channel with a mobile station, and a transmission phase of a second frame signal, which is transmitted from a second base station that is expected to newly set up a communication channel with the mobile station, said method comprising:

detecting a phase difference at the mobile station between the first frame signal and the second frame signal;

reporting the detected phase difference from the mobile station to the first base station as first phase difference information;

reporting the detected phase difference from the first base station to the second base station as second phase difference information and a time stamp; and synchronizing the transmission phase of the second frame signal with the transmission phase of the first frame signal according to the phase difference information and the time stamp.

2. The method according to claim 1, wherein the time stamp is a sequence number.

3. The method according to claim 1, wherein the first frame signal includes a plurality of miniframes, and said method further comprises adding the time stamp to the miniframes.

4. The method according to claim 1, wherein the first and second base stations are controlled by a mobile communication control center so as to connect a communication network, and said method further comprises generating the time stamp in the communication control center.

* * * * *